(12) United States Patent
Chen et al.

(10) Patent No.: US 8,483,463 B2
(45) Date of Patent: Jul. 9, 2013

(54) METHOD FOR RADIATION DOSE REDUCTION USING PRIOR IMAGE CONSTRAINED IMAGE RECONSTRUCTION

(75) Inventors: Guang-Hong Chen, Madison, WI (US); Jie Tang, Madison, WI (US); Brian Nett, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 718 days.

(21) Appl. No.: 12/783,058

(22) Filed: May 19, 2010

(65) Prior Publication Data

US 2011/0286646 A1 Nov. 24, 2011

(51) Int. Cl.
*G06K 9/00* (2006.01)
(52) U.S. Cl.
USPC .......................................... 382/131; 382/132
(58) Field of Classification Search
None
See application file for complete search history.

(56) References Cited

U.S. PATENT DOCUMENTS

| | | | |
|---|---|---|---|
| 4,878,169 A | 10/1989 | Toner et al. | |
| 6,841,998 B1 | 1/2005 | Griswold | |
| 7,289,049 B1 | 10/2007 | Fudge et al. | |
| 7,330,027 B2 | 2/2008 | Kozerke et al. | |
| 7,358,730 B2 | 4/2008 | Mistretta et al. | |
| 7,408,347 B2 | 8/2008 | Mistretta et al. | |
| 7,519,412 B2 | 4/2009 | Mistretta | |
| 7,545,901 B2 | 6/2009 | Mistretta | |
| 7,558,414 B2 | 7/2009 | Griswold | |
| 7,646,924 B2 | 1/2010 | Donoho | |
| 7,647,088 B2 | 1/2010 | Mistretta et al. | |
| 8,150,112 B2 * | 4/2012 | Kadir et al. | 382/128 |
| 8,194,937 B2 * | 6/2012 | Chen | 382/118 |
| 8,374,413 B2 * | 2/2013 | Chen | 382/131 |
| 2007/0010731 A1 | 1/2007 | Mistretta | |
| 2007/0038073 A1 | 2/2007 | Mistretta | |
| 2007/0106149 A1 | 5/2007 | Mistretta | |
| 2007/0156044 A1 | 7/2007 | Mistretta et al. | |
| 2007/0167707 A1 | 7/2007 | Mistretta et al. | |
| 2007/0167728 A1 | 7/2007 | Mistretta et al. | |
| 2007/0167729 A1 | 7/2007 | Mistretta et al. | |
| 2008/0199063 A1 | 8/2008 | O'Halloran et al. | |
| 2008/0219535 A1 | 9/2008 | Mistretta et al. | |
| 2009/0076369 A1 | 3/2009 | Mistretta | |
| 2009/0129651 A1 | 5/2009 | Zagzebski et al. | |

(Continued)

OTHER PUBLICATIONS

PCT/US2011/023579 Search Report and Written Opinion, May 12, 2011.

(Continued)

*Primary Examiner* — Robert Morgan
*Assistant Examiner* — Michael Tomaszewski
(74) *Attorney, Agent, or Firm* — Quarles & Brady, LLP

(57) ABSTRACT

A method for reconstructing an image of a subject with a medical imaging system is provided. Image data is acquired with the medical imaging system, typically in an undersampled manner. A prior image constrained compressed sensing (PICCS) image reconstruction method is then implemented to reconstruct images of the subject being imaged. The prior image used in such a method is produced from so-called averaged image data. The averaged image data is produced by effectively averaging signal information associated with a plurality of different slice locations along a direction orthogonal to the plane parallel to the slice locations. Weightings are calculated from images reconstructed in a conventional manner from the acquired image data, and these weightings are employed to produce the averaged image data. By producing a prior image in this manner, a higher signal-to-noise ratio is achievable, allowing trade-offs with factors such as radiation dose in x-ray imaging.

13 Claims, 12 Drawing Sheets

U.S. PATENT DOCUMENTS

| | | | |
|---|---|---|---|
| 2009/0161932 A1 | 6/2009 | Chen | |
| 2009/0161933 A1 | 6/2009 | Chen | |
| 2009/0175523 A1 | 7/2009 | Chen | |
| 2009/0262996 A1* | 10/2009 | Samsonov et al. | 382/130 |
| 2009/0274355 A1* | 11/2009 | Chen et al. | 382/131 |
| 2011/0286646 A1* | 11/2011 | Chen et al. | 382/131 |
| 2012/0314927 A1* | 12/2012 | Chen | 382/131 |

OTHER PUBLICATIONS

Nett et al, Perfusion measurement by micro-CT using prior image constrained compressed sensing (PICCS): initial phantom results, Physics in Medicine and Biology vol. 55, No. 8 (Apr. 8, 2010) 2333 2350.

Candes, et al., Robust Uncertainty Principles: Exact Signal Reconstruction from Highly Incomplete Frequency Information, IEEE Transactions on Information Theory, vol. 52, No. 2, Feb. 2006, 489-509.

Chen, Prior Image Constrained Compressed Sensing (PICCS); Proc Soc Photo Opt Instrum Eng, Mar. 3, 2008; 6856: 685618. doi:10.1117/12.770532.

Chen, Prior Image Constrained Compressed Sensing (PICCS): A Method to Accurately Reconstruct Dynamic CT Images from Highly Undersampled Projection Data Sets; Med. Phys., Feb. 2008; 35(2):660-663.

Donoho, Compressed Sensing, Sep. 14, 2004, pp. 1-34.

Donoho, Compressed Sensing, IEEE Transactions on Information Theory, vol. 52, No. 4, Apr. 2006, 1289-1306.

Fessler, et al., Iterative Image Reconstruction in MRI With Separate Magnitude and Phase Regularization, IEEE International Symposium on Biomedical Imaging: Nano to Macro, 2004; 1:209-212.

Lustig, et al., Rapid MR Imaging with 'Compressed Sensing' and Randomly Under-Sampled 3DFT Trajectories, Proc. Intl. Soc. Mag. Reson. Med. 14 (2006), p. 695.

Lustig, Student Member, IEEE, Compressed Sensing MRI, 18 pages, 2007.

Lustig, et al., Sparse MRI: The Application of Compressed Sensing for Rapid MR Imaging, Magnetic Resonance in Medicine 58:1182-1195 (2007).

Mistretta, et al., Highly Constrained Backprojection for Time-Resolved MRI, Magn Reson Med, 2006, 55(1):30-40.

Nett, et al., Tomosynthesis via Total Variation Minimization Reconstruction and Prior Image Constrained Compressed Sensing (PICCS) on a C-arm System; Proc Soc Photo Opt Instrum Eng, Mar. 18, 2008; 6913: nihpa92672. doi:10.1117/12.771294.

O'Halloran, et al., Iterative Projection Reconstruction of Time-Resolved Images Using Highly-Constrained Back-Projection (HYPR), Magn Reson Med, 2008, 59:132-139 (published online Dec. 3, 2007).

Schmidt, Least Squares Optimization with L1-Norm Regularization, Dec. 2005, pp. 1-12.

Song, et al., Sparseness Prior Based Iterative Image Reconstruction for Retrospectively Gated Cardiac Micro-CT, Med. Phys. 34(11), Nov. 2007, pp. 4476-4483.

* cited by examiner

METHOD FOR RADIATION DOSE REDUCTION USING PRIOR IMAGE CONSTRAINED IMAGE RECONSTRUCTION

STATEMENT REGARDING FEDERALLY SPONSORED RESEARCH

This invention was made with United States Government support awarded by the following agency: National Institutes of Health, NIH EB005712. The United States Government has certain rights in this invention.

BACKGROUND OF THE INVENTION

The field of the invention is medical imaging system and methods. More particularly, the present invention relates to methods for image reconstruction that allow desirable levels of signal-to-noise ratio to be maintained while balancing other imaging considerations such as decreases in radiation dose and scan time.

In medical imaging, as well as other imaging technologies, signal-to-noise ratio ("SNR") is utilized as a quantitative measure of image quality. Generally, SNR is defined as the ratio between the mean intensity value and the root-mean-square ("RMS") noise, $\sigma$, in an image. The term "net signal" refers to the difference between an average signal value over the image, and background values, whereas the term RMS noise refers to the standard deviation of the noise value in the image. As SNR decreases in a medical image, it becomes increasingly more difficult to differentiate between anatomical features and other clinical findings of importance to the clinician. Thus, it is generally desirable to preserve a relatively high SNR in medical imaging applications.

In a computed tomography system, an x-ray source projects a fan-shaped beam which is collimated to lie within an x-y plane of a Cartesian coordinate system, termed the "image plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce what is called the "transmission profile," "attenuation profile," or "projection."

The source and detector array in a conventional CT system are rotated on a gantry within the imaging plane and around the object so that the angle at which the x-ray beam intersects the object constantly changes. The transmission profile from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This image reconstruction process converts the attenuation measurements acquired during a scan into integers called "CT numbers" or "Hounsfield units", which are used to control the brightness of a corresponding pixel on a display.

Magnetic resonance imaging ("MRI") uses the nuclear magnetic resonance ("NMR") phenomenon to produce images. When a substance such as human tissue is subjected to a uniform magnetic field (polarizing field $B_0$), the individual magnetic moments of the nuclei in the tissue attempt to align with this polarizing field, but precess about it in random order at their characteristic Larmor frequency. If the substance, or tissue, is subjected to a magnetic field (excitation field $B_1$) that is in the x-y plane and that is near the Larmor frequency, the net aligned moment, $M_z$, may be rotated, or "tipped," into the x-y plane to produce a net transverse magnetic moment $M_{xy}$. A signal is emitted by the excited nuclei or "spins," after the excitation signal $B_1$ is terminated, and this signal may be received and processed to form an image.

When utilizing these "MR" signals to produce images, magnetic field gradients ($G_x$, $G_y$, and $G_z$) are employed. Typically, the region to be imaged is scanned by a sequence of measurement cycles in which these gradients vary according to the particular localization method being used. The resulting set of received MR signals are digitized and processed to reconstruct the image using one of many well known reconstruction techniques.

The measurement cycle used to acquire each MR signal is performed under the direction of a pulse sequence produced by a pulse sequencer. Clinically available MRI systems store a library of such pulse sequences that can be prescribed to meet the needs of many different clinical applications. Research MRI systems include a library of clinically-proven pulse sequences and they also enable the development of new pulse sequences.

The MR signals acquired with an MRI system are signal samples of the subject of the examination in Fourier space, or what is often referred to in the art as "k-space." Each MR measurement cycle, or pulse sequence, typically samples a portion of k-space along a sampling trajectory characteristic of that pulse sequence. Most pulse sequences sample k-space in a raster scan-like pattern sometimes referred to as a "spin-warp," a "Fourier," a "rectilinear," or a "Cartesian" scan. The spin-warp scan technique employs a variable amplitude phase encoding magnetic field gradient pulse prior to the acquisition of MR spin-echo signals to phase encode spatial information in the direction of this gradient. In a two-dimensional implementation ("2DFT"), for example, spatial information is encoded in one direction by applying a phase encoding gradient, $G_y$, along that direction, and then a spin-echo signal is acquired in the presence of a readout magnetic field gradient, $G_x$, in a direction orthogonal to the phase encoding direction. The readout gradient present during the spin-echo acquisition encodes spatial information in the orthogonal direction. In a typical 2DFT pulse sequence, the magnitude of the phase encoding gradient pulse, $G_y$, is incremented, $\Delta G_y$, in the sequence of measurement cycles, or "views" that are acquired during the scan to produce a set of k-space MR data from which an entire image can be reconstructed.

There are many other k-space sampling patterns used by MRI systems. These include "radial", or "projection reconstruction" scans in which k-space is sampled as a set of radial sampling trajectories extending from the center of k-space. The pulse sequences for a radial scan are characterized by the lack of a phase encoding gradient and the presence of a readout gradient that changes direction from one pulse sequence view to the next. There are also many k-space sampling methods that are closely related to the radial scan and that sample along a curved k-space sampling trajectory rather than the straight line radial trajectory.

An image is reconstructed from the acquired k-space data by transforming the k-space data set to an image space data set. There are many different methods for performing this task and the method used is often determined by the technique used to acquire the k-space data. With a Cartesian grid of k-space data that results from a 2D or 3D spin-warp acquisition, for example, the most common reconstruction method used is an inverse Fourier transformation ("2DFT" or "3DFT") along each of the 2 or 3 axes of the data set. With a radial k-space data set and its variations, the most common reconstruction method includes "regridding" the k-space samples to create a Cartesian grid of k-space samples and then performing a 2DFT or 3DFT on the regridded k-space data set. In the alternative, a radial k-space data set can also be transformed to Radon space by performing a 1DFT of each radial projection view and then transforming the Radon space data set to image space by performing a filtered backprojection.

According to standard image reconstruction theories, in order to reconstruct an image without aliasing artifacts, the sampling rate employed to acquire image data must satisfy the so-called Nyquist criterion, which is set forth in the Nyquist-Shannon sampling theorem. Moreover, in standard image reconstruction theories, no specific prior information about the image is needed. On the other hand, when some prior information about the desired image is available and appropriately incorporated into the image reconstruction procedure, an image can be accurately reconstructed even if the Nyquist criterion is violated. For example, if one knows a desired image is circularly symmetric and spatially uniform, only one view of parallel-beam projections (i.e., one projection view) is needed to accurately reconstruct the linear attenuation coefficient of the object. As another example, if one knows that a desired image consists of only a single point, then only two orthogonal projections that intersect at the point are needed to accurately reconstruct the image point. Thus, if prior information is known about the desired image, such as if the desired image is a set of sparsely distributed points, it can be reconstructed from a set of data that was acquired in a manner that does not satisfy the Nyquist criterion. Put more generally, knowledge about the sparsity of the desired image can be employed to relax the Nyquist criterion; however, it is a nontrivial task to generalize these arguments to formulate a rigorous image reconstruction theory.

The Nyquist criterion serves as one of the paramount foundations of the field of information science. However, it also plays a pivotal role in modern medical imaging modalities such as magnetic resonance imaging ("MRI") and x-ray computed tomography ("CT"). When the number of data samples acquired by an imaging system is less than the requirement imposed by the Nyquist criterion, artifacts appear in the reconstructed images. In general, such image artifacts include aliasing and streaking artifacts. In practice, the Nyquist criterion is often violated, whether intentionally or through unavoidable circumstances. For example, in order to shorten the data acquisition time in a time-resolved MR angiography study, undersampled projection reconstruction, or radial, acquisition methods are often intentionally introduced.

The risks associated with exposure to the ionizing radiation used in medical imaging, including x-ray computed tomography ("CT") and nuclear myocardial perfusion imaging ("MPI"), have increasingly become a great concern in recent years as the number CT and nuclear MPI studies has dramatically increased. The reported effective radiation dose from a cardiac CT angiography session is approximately 5-20 millisievert ("mSv") for male patients and even higher for female patients. This dose is in addition to the smaller radiation dose from the calcium scoring CT scan that is routinely performed prior to intravenous contrast injection. To perform CT-MPI as part of a comprehensive cardiac CT study would require acquiring images over the same region of the heart approximately 20-30 times, resulting in an increase in radiation dose of approximately twenty- to thirty-fold, which is an unacceptable level of radiation exposure.

When parameters of an x-ray imaging study, such as tube current and tube current time product, "mAs", are varied in order to decrease the radiation dose imparted to the subject, the signal-to-noise ratio ("SNR") of the resultant images suffers. For example, decreasing tube current produces a related decrease in radiation dose; however, the noise present in the resultant images is increased, thereby affecting SNR in accordance with the following relationship:

$$SNR = \frac{\mu}{\sigma} \propto \sqrt{\text{Dose}} \propto \sqrt{mAs}; \qquad \text{Eqn. (1)}$$

where $\mu$ is the measured linear attenuation coefficient and $\sigma$ is the RMS noise. Thus, if mAs is reduced by half, SNR will decrease by a factor of $\sqrt{1/2}$, which corresponds to about a 30 percent decrease in SNR. Thus, while decreasing mAs during an x-ray imaging study provides a beneficial decrease in radiation dose imparted to the subject being imaged, the resultant images suffer from increased noise and, therefore, decreased SNR. Such images have limited clinical value.

Depending on the technique used, many MR scans currently require many minutes to acquire the necessary data used to produce medical images. The reduction of this scan time is an important consideration, since reduced scan time increases patient throughput, improves patient comfort, and improves image quality by reducing motion artifacts. Many different strategies have been developed to shorten the scan time.

One such strategy is referred to generally as "parallel MRI" ("pMRI"). Parallel MRI techniques use spatial information from arrays of radio frequency ("RF") receiver coils to substitute for the spatial encoding that would otherwise have to be obtained in a sequential fashion using RF pulses and magnetic field gradients, such as phase and frequency encoding gradients. Each of the spatially independent receiver coils of the array carries certain spatial information and has a different spatial sensitivity profile. This information is utilized in order to achieve a complete spatial encoding of the received MR signals, for example, by combining the simultaneously acquired data received from each of the separate coils. Parallel MRI techniques allow an undersampling of k-space by reducing the number of acquired phase-encoded k-space sampling lines, while keeping the maximal extent covered in k-space fixed. The combination of the separate MR signals produced by the separate receiver coils enables a reduction of the acquisition time required for an image, in comparison to a conventional k-space data acquisition, by a factor related to the number of the receiver coils.

While the use of parallel MRI acts to decrease the amount of time required to image a subject without increasing gradient switching rates or RF power, parallel MRI methods are plagued with losses in signal-to-noise ratio ("SNR"). In general, the SNR of an image reconstructed using parallel MRI methods is decreased in accordance with the following relationship:

$$SNR \propto \frac{1}{g\sqrt{R}}; \qquad \text{Eqn. (2)}$$

where g is the so-called geometry factor, or "g-factor," and R is the acceleration factor, which describes the degree of undersampling employed and is related to, and generally limited by, the number of receiver coils in the array. Thus, parallel MRI methods suffer from a reduction in achievable SNR, offsetting the benefits provided by decreased scan time requirements.

It would therefore be desirable to provide a method for reconstructing an image of a subject from medical image data such that higher signal-to-noise ratio ("SNR") is achievable as compared to currently available methods. It would further be desirable to provide a method for reconstructing an image of a subject in the aforementioned manner such that trade-offs between SNR and other considerations, such as radiation dose in x-ray imaging and scan time in magnetic resonance imaging, can be balanced without a significant loss in SNR.

SUMMARY OF THE INVENTION

The aforementioned drawbacks are overcome by the present invention, which provides a method for reconstructing an image of a subject, the reconstructed image having a high signal-to-noise ratio ("SNR") inherited from a prior image formed by averaging acquired image data along a slice direction, but not having a low spatial resolution often present in such a prior image. A plurality of images are reconstructed from the acquired image data, in which the plurality of images corresponding to a respective plurality of image slices. For each image slice location, a weighting value is calculated using these reconstructed images. For example, a comparison between adjacent image slices is used to calculate the desired weighting value for a given slice location. Weighted image data is formed by applying the calculated plurality of weightings to the acquired image data such that the acquired image data is filtered along a direction orthogonal to an orientation of the plurality of image slices, the so-called "slice direction." A prior image is reconstructed from this weighted image data, the prior image then being used in a PICCS reconstruction algorithm to reconstruct target images of the subject that inherit the high SNR of the prior image, but preserve the high spatial resolution of the acquired image data.

The present invention provides an image reconstruction method applicable to a number of different imaging modalities including x-ray computed tomography ("CT"), x-ray C-arm imaging, magnetic resonance imaging ("MRI"), positron emission tomography ("PET"), and single photon emission computed tomography ("SPECT"). More specifically, the present invention provides an image reconstruction method that provides an increase in achievable signal-to-noise ratio ("SNR") in reconstructed images, without a significant decrease in spatial resolution. In this manner, trade-offs can be made with respect to other imaging considerations, such as radiation dose imparted to a subject and overall scan time, without a significant decrease in SNR as compared to currently available methods for image reconstruction.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
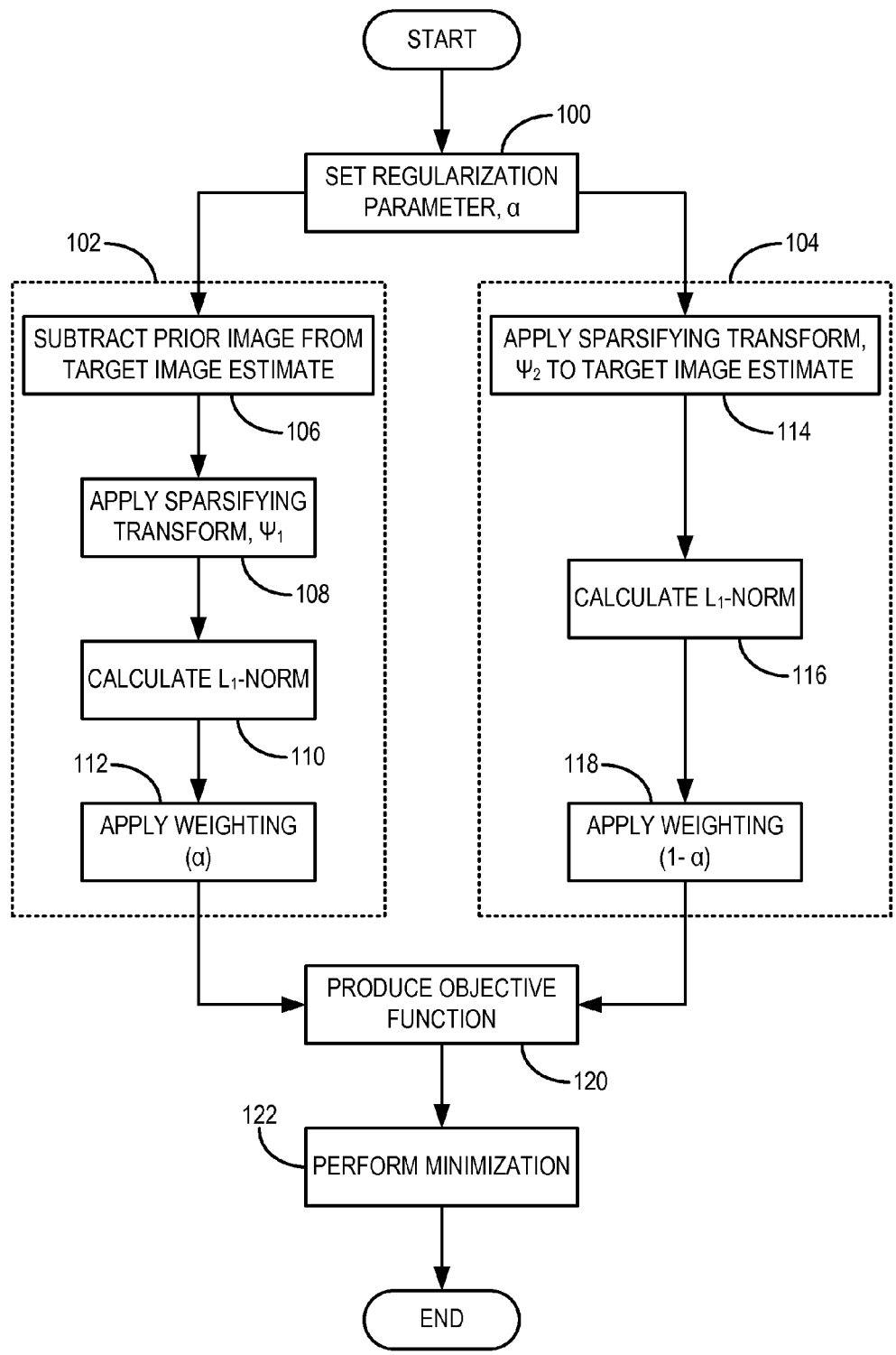
FIG. 1 is a flowchart setting forth the steps of an exemplary image reconstruction method employed when practicing the present invention.

Generally speaking, the method of reconstructing an image from a set of data includes a series of numerical steps to estimate a desired image, I, from the measured data samples, Y. More specifically, the image reconstruction should fulfill the following consistency condition:

$$AI=Y \qquad \text{Eqn. (3);}$$

where A is a system matrix. In general, the system matrix, A, can be viewed as a forward projection operator that relates the desired image, I, to the acquired data samples, Y. When dealing with computed tomography ("CT") imaging, the system matrix can include a reprojection operation, while in magnetic resonance imaging ("MRI"), it can include a Fourier transform operation. The consistency condition of Eqn. (3), put in other words, states that when an image is faithfully reconstructed, the forward operation should substantially mimic the actual data acquisition procedure in order to generate a correct estimate of the measured projection data.

Turning now to the method of the present invention, a method for reconstructing a quality desired image is provided. In general, a "prior image" is employed to constrain an iterative image reconstruction method, in which the principles of compressed sensing ("CS") are utilized. For example, in addition to the sparsifying transforms commonly used in CS, an image is further sparsified by subtracting the prior image from the desired image. In this manner, the image reconstruction method is referred to as prior image constrained compressed sensing, or "PICCS." Using PICCS, an image can be accurately reconstructed using a substantially fewer number of samples than required by CS methods.

More specifically, given a prior image, $I_P$, and a desired image to be reconstructed, I, the method of the present invention for image reconstruction is implemented by minimizing the following objective function:

$$\alpha\|\Psi_1(I-I_P)\|_1+(1-\alpha)\|\Psi_2 I\|_1 \qquad \text{Eqn. (4)};$$

where $\Psi_1$ and $\Psi_2$ are sparsifying transforms, $\|\ldots\|_1$ is an $L_1$-norm operation, and $\alpha$ is a regularization parameter that is utilized to control the relative weight of the two terms in the objective function of Eqn. (4). It is noted that, $$\|x\|_1 = \sum_{i=1}^{N} |x_i|; \qquad \text{Eqn. (5)}$$

indicates the $L_1$-norm of an N-dimensional vector, x. More generally, a deviation from the true $L_1$-norm is possible while still maintaining adequate image quality in the desired image. For example, the objective function of Eqn. (4) can be generalized as:

$$\alpha\|\Psi_1(I-I_P)\|_p+(1-\alpha)\|\Psi_2 I\|_p, \qquad \text{Eqn. (6)}$$

where $\|\ldots\|_p$ is an $L_p$-norm operation having the form:

$$\|x\|_p = \left(\sum_{i=1}^{N} |x_i|^p\right)^{1/p}. \qquad \text{Eqn. (7)}$$

As noted above, preferably, p=1.0; however, in the alternative, different values of p are possible. It should be appreciated by those skilled in the art that the further the value of p deviates from p=1.0, generally, the more degradation will be evident in the reconstructed desired image.

The sparsifying transforms in Eqn. (4), $\Psi_1$ and $\Psi_2$, are, in general, different; however, in the alternative, $\Psi_1$ and $\Psi_2$ may be the same sparsifying transform. Exemplary sparsifying transforms include a wavelet transform, a first order finite difference, a second order finite difference, and a discrete gradient transform, such as, for example, a discrete gradient transform, $\nabla_{m,n}$, having the following form:

$$\nabla_{m,n}I(m,n)=\sqrt{[I(m+1,n)-I(m,n)]^2+[I(m,n+1)-I(m,n)]^2} \qquad \text{Eqn. (8)};$$

where the indices m and n indicate the location of a pixel in an image, I. The image specified as $\nabla_{m,n}I(m,n)$ is commonly referred to as the "gradient image."

Both of the terms in the objective function of Eqn. (4) are important. As a result of their importance, the selection of the regularization parameter, $\alpha$, is utilized to control the overall image reconstruction process. Therefore, the selection of the regularization parameter, $\alpha$, will depend on the choice of the prior image, $I_P$, and also the clinical application at hand. For example, the second term in the objective function of Eqn. (4), $(1-\alpha)\|\Psi_2 I\|_1$, mitigates streaking, or other, artifacts that are potentially inherited from the prior image, $I_P$. By way of further example, selecting a regularization parameter of $\alpha \approx 0.3$-$0.7$ is generally sufficient for cardiac imaging applications.

To better incorporate the consistency condition of Eqn. (3) into the overall image reconstruction, the method of Lagrange multipliers is utilized. In such a manner, the consistency condition is employed to add a further constraint on the minimization of the objective function set forth in Eqn. (4). A new objective function is thus produced, which has the form:

$$\alpha\|\Psi_1(I-I_P)\|_1+(1-\alpha)\|\Psi_2 I\|_1+\lambda\|X\|_2^2 \qquad \text{Eqn. (9)};$$

where $\lambda$ is the Lagrange multiplier, X is a difference matrix, and $\|\ldots\|_2^2$ is a squared $L_2$-norm operation, which, for an N-dimensional vector, x, has the form:

$$\|x\|_2^2 = \sum_{i=1}^{N} x_i^2. \qquad \text{Eqn. (10)}$$

The difference matrix in Eqn. (9) accounts for the consistency condition of Eqn. (3), and has the following form:

$$X=AI-Y \qquad \text{Eqn. (11)}.$$

The Lagrange multiplier, $\lambda$, is determined empirically for the particular imaging system employed when practicing the present invention. For example, the Lagrange multiplier, $\lambda$, is determined by a pre-determined tradeoff between the desired data consistency requirement and the similarity to the prior image, $I_P$. When a large Lagrange multiplier, $\lambda$, is selected, the reconstructed image has lower noise variance; however, this may be achieved as a loss of the high spatial resolution characteristic of the prior image. Similarly, when a smaller Lagrange multiplier, $\lambda$, is used, the high spatial resolution characteristic of the prior image is well preserved, but the noise variance can be high in the desired image. Such a situation affects the contrast-to-noise ratio achievable by the imaging system utilized. As will be described below in detail, however, a large Lagrange multiplier, $\lambda$, need not be employed to provide an increase, or maintenance of an existing desirable level of, signal-to-noise ratio ("SNR"). Instead, a high SNR prior image, $I_P$, is produced and the SNR imparted to the desired image, I.

The objective function presented in Eqn. (9) can further be altered in order to account for noise of the imaging system. In such a manner, the following objective function is minimized:

$$\alpha\|\Psi_1(I-I_P)\|_1+(1-\alpha)\|\Psi_2 I\|_1+\lambda(X^T DX) \qquad \text{Eqn. (12)};$$

where $X^T$ is the transpose of the difference matrix, X, and D is a system noise matrix, which is a diagonal matrix having the following matrix elements:

$$D_{ij} = \begin{cases} \frac{1}{\sigma_n^2} & \text{if } i=j \\ 0 & \text{if } i \neq j, \end{cases} \qquad \text{Eqn. (13)}$$

where $\sigma_n^2$ is the noise variance, and is a parameter indicative of noise in the imaging system employed when practicing the present invention. For example, in an x-ray imaging system, the noise parameter, $\sigma_n^2$, is the noise variance associated with the $n^{th}$ x-ray detector. Alternatively, in an MR imaging system, the noise parameter, $\sigma_n^2$, is estimated noise variance in the $n^{th}$ receiver coil.

In the method of the present invention, the prior image, $I_P$, plays several roles. First, it serves as a seed image in the iterative reconstruction, which accelerates the overall image reconstruction method. Second, the prior image, $I_P$, is employed to further sparsify the desired image, I, and, thus, serves as yet another sparsifying transform. In addition, as will be described below in detail, the SNR in the prior image, $I_P$, is imparted to the desired image, I, thereby allowing the reconstruction of a desired image, I, having both a high SNR and high spatial resolution.

A brief discussion of possible prior images, $I_P$, is provided below with respect to different imaging modalities; however, it should be appreciated by those skilled in the art that prior images, $I_P$, other than those expressly described herein can be employed depending on the clinical application. As referred to herein, a prior image, $I_P$, is an image of the subject that includes a priori information indicative of the desired image to be reconstructed. The prior image, $I_P$, can be from a previously performed imaging study, or can be reconstructed from image data acquired in the same session as the image data acquired for the desired images. Typically, the prior image, $I_P$, is acquired using the same imaging modality as the desired images; however, there are applications where the prior image, $I_P$, can be obtained from a different imaging modality than the desired images, such as, for example, when employing combined PET-CT systems.

With reference now to FIG. 1, one implementation of the method of the present invention employs the objective function of Eqn. (4), and begins by initializing the regularization parameter, $\alpha$, as indicated at step 100. The choice of the regularization parameter, $\alpha$, determines the trade-off between the sparsity of the desired image, and the influence of the prior image on the desired image. Accordingly, the value of the regularization parameter, $\alpha$, will vary depending on the clinical application at hand. For example, a value of $\alpha \approx 0.3$-$0.7$ is generally sufficient for cardiac imaging applications. Subsequently, the first and second terms in the objective function of Eqn. (4) are initialized, as indicated in steps 102 and 104, respectively. The initialization of the first term, $\alpha \|\Psi_1(I-I_P)\|_1$, begins at step 106 where the prior image, $I_P$, is subtracted from an estimate of the desired image, I, to produce a "difference image." The particular choice of the prior image, $I_P$, and the estimate of the desired image, I, will depend on the imaging modality and the particular clinical application. Accordingly, different alternatives for these choices will be discussed in detail below. The difference image is subsequently sparsified by applying the sparsifying transform, $\Psi_1$, as indicated at step 108. As described above, the sparsifying transform, $\Psi_1$, can be any number of mathematical operations, including a wavelet transform, a first order finite difference, a second order finite difference, and a discrete gradient transform. The $L_1$-norm of this sparsified difference image is then calculated at step 110. The result of this process is then weighted by the regularization parameter, $\alpha$, as indicated at step 112.

The initialization of the second term in the objective function of Eqn. (4), $(1-\alpha)\|\Psi_2 I\|_1$, begins at step 114 where the estimate of the desired image, I, is sparsified through the application of the sparsifying transform, $\Psi_2$. Subsequently, the $L_1$-norm of this sparsified desired image estimate is calculated at step 116. When the discrete gradient transform, $\nabla_{m,n}$, is selected as the sparsifying transform, $\Psi_2$, steps 114 and 116 can be viewed as calculating the total variation, TV, of the desired image estimate, which has the form:

$$TV(I) = \|\nabla I\|_1 = \Sigma |\nabla I| \qquad \text{Eqn. (14)}.$$

After the $L_1$-norm of the sparsified desired image estimate is calculated, the result is weighted by $(1-\alpha)$, as indicated at step 118. The objective function of Eqn. (4) is subsequently produced in step 120 by adding the first and second terms together. This objective function is then minimized, as indicated at step 122, using, for example, a nonlinear conjugate gradient method. The minimization process proceeds until a stopping criterion is satisfied. The stopping criterion includes, for example, comparing the current estimate of the desired image with the estimate of the desired image from the previous iteration. Such a stopping criterion has the following form:

$$\sum_i \sum_j (I_{ij}^{(k+1)} - I_{ij}^{(k)})^2; \qquad \text{Eqn. (15)}$$

where, $I_{ij}^{(k+1)}$ is the value of the $(k+1)^{th}$ estimate of the desired image at the pixel location (i,j), and $I_{ij}^{(k)}$ is the value of the $k^{th}$ estimate of the desired image at the pixel location (i,j).

Figure 2:
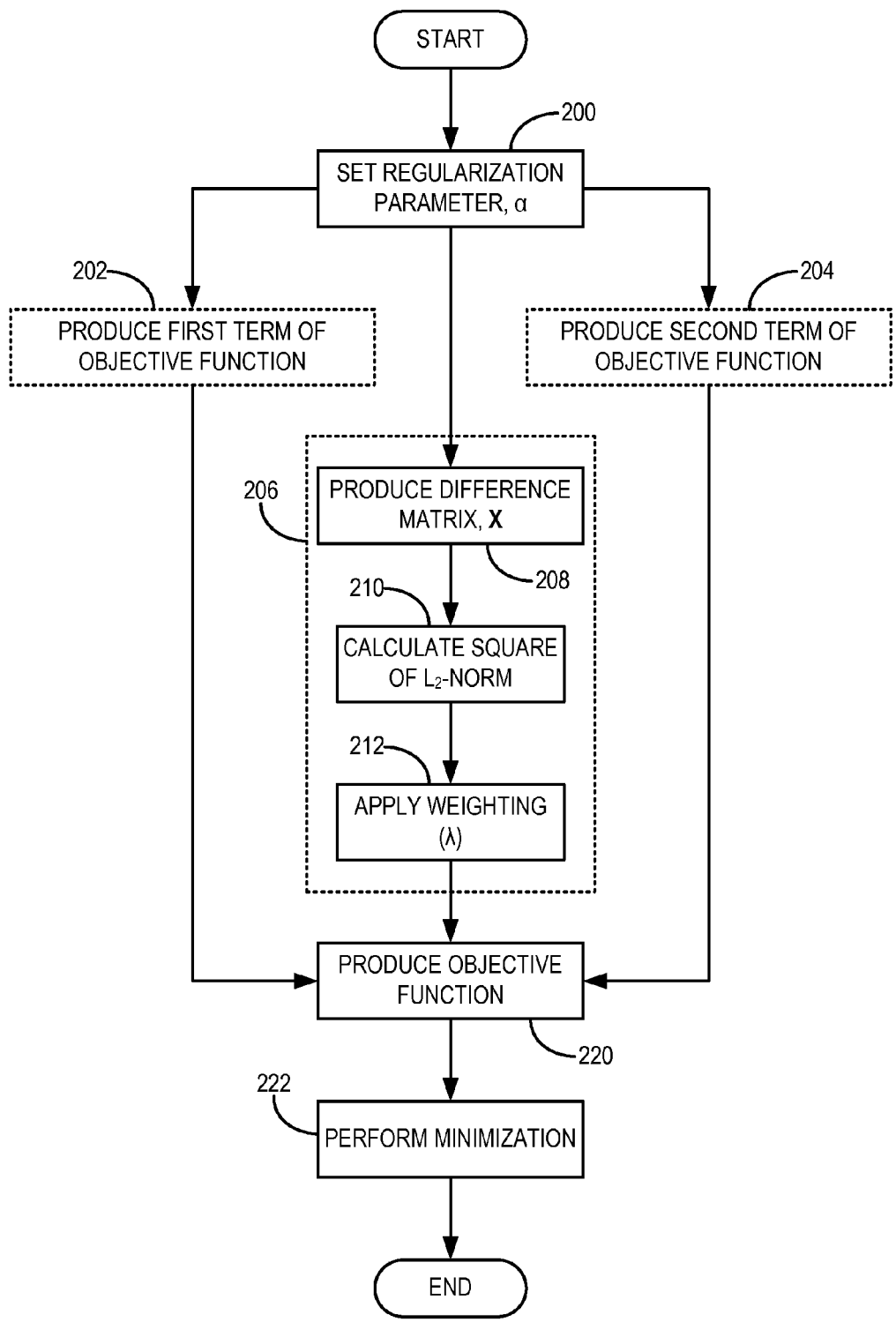
FIG. 2 is a flowchart setting forth the steps of another exemplary image reconstruction method employed when practicing the present invention.

With reference now to FIG. 2, another implementation of the method of the present invention employs the objective function of Eqn. (9), and begins by initializing the regularization parameter, $\alpha$, as indicated at step 200. Subsequently, the first and second terms in the objective function of Eqn. (9) are initialized, as indicated in steps 202 and 204, respectively. This process proceeds in the same manner as described above with reference to steps 102 and 104 in FIG. 1. Now, however, the consistency condition of Eqn. (3) is incorporated into a third term, $\lambda \|X\|_2^2$, which is initialized at step 206. First, the difference matrix, X, is produced, as indicated at step 208. As described above in detail, the difference matrix, X, corresponds to the consistency condition of Eqn. (3) and has the following form:

$$X = AI - Y \qquad \text{Eqn. (16)}.$$

Thus, the difference matrix is determined by applying the system matrix, A, to the estimate of the desired image, I, and subsequently subtracting the acquired image data, Y, that corresponds to the desired image. The square of the $L_2$-norm of the difference matrix, X, is calculated next at step 210. After the square of the $L_2$-norm of the difference matrix, X, has been produced, the Lagrange multiplier, $\lambda$, is determined and employed to weight the difference matrix, X, as indicated at step 212. As described above, the Lagrange multiplier is empirically determined by and the value selected by the user based on the clinical application at hand. The objective function of Eqn. (9) is subsequently produced in step 220 by adding the first, second, and third terms together. This objective function is then minimized, as indicated at step 222, using, for example, a nonlinear conjugate gradient method. The minimization process proceeds until a stopping criterion is satisfied, as described above.

Figure 3:
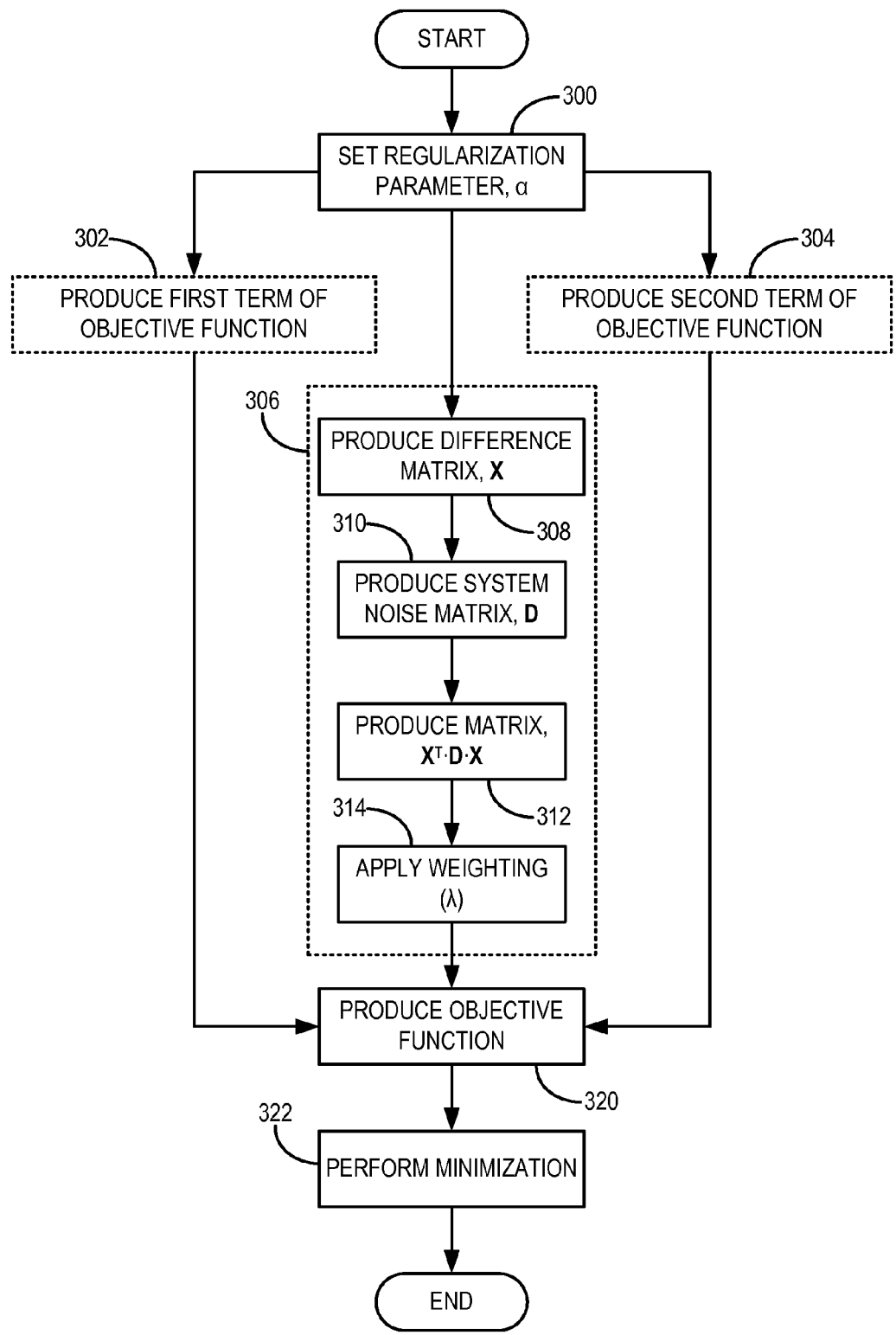
FIG. 3 is a flowchart setting forth the steps of yet another exemplary image reconstruction method employed when practicing the present invention.

With reference now to FIG. 3, yet another implementation of the method of the present invention employs the objective function of Eqn. (12), and begins by initializing the regularization parameter, $\alpha$, as indicated at step 300. Subsequently, the first and second terms in the objective function of Eqn. (12) are initialized, as indicated in steps 302 and 304, respectively. This process proceeds in the same manner as described above with reference to steps 102 and 104 in FIG. 1. Now, however, the consistency condition of Eqn. (3) and the effects of noise in the imaging system are incorporated into a third term, $\lambda(X^T D X)$, which is initialized at step 306. First, the difference matrix, X, is produced, as indicated at step 308, and described above with reference to step 208 in FIG. 2. Next, a system noise matrix, D, is produced, as indicated in step 310. The system noise matrix, D, is a diagonal matrix having matrix elements determined in accordance with the following:

$$D_{ij} = \begin{cases} \dfrac{1}{\sigma_n^2} & \text{if } i = j \\ 0 & \text{if } i \neq j. \end{cases} \quad \text{Eqn. (17)}$$

As described above, $\sigma_n^2$ is the noise variance, and is a parameter indicative of noise in the imaging system employed when practicing the present invention. For example, in an x-ray imaging system, the noise parameter, $\sigma_n^2$, is the noise variance associated with the $n^{th}$ x-ray detector. Alternatively, in an MR imaging system, the noise parameter, $\sigma_n^2$, is estimated noise variance in the $n^{th}$ receiver coil. After the system noise matrix, D, has been produced, the following matrix multiplication is performed:

$$X^T DX \quad \text{Eqn. (18);}$$

as indicated at step 312. The result of this operation is subsequently scaled by the Lagrange multiplier, as indicated at step 314. The objective function of Eqn. (12) is subsequently produced in step 320 by adding the first, second, and third terms together. This objective function is then minimized, as indicated at step 322, using, for example, a nonlinear conjugate gradient method. The minimization process proceeds until a stopping criterion is satisfied, as described above.

With the appropriate choice of a prior image, $I_p$, a desired image, $I$, can be reconstructed with both high SNR and spatial resolution. In general, the SNR of the prior image, $I_p$, is imparted to the desired image, $I$, by way of the aforementioned PICCS image reconstruction methods. Therefore, consideration of how the prior image, $I_p$, is produced can provide benefits to how the image data is originally acquired. For example, in x-ray imaging, a lower tube current is employed to reduce the radiation dose imparted to the subject being imaged. Such a reduction in tube current produces an increase in the amount of noise present in images reconstructed from the data acquired with the decreased tube current. But, this increase in image noise is mitigated by the method of the present invention, while maintaining desirable levels of spatial resolution, thereby allowing a decrease in radiation dose imparted to the subject with substantially minimal detriment to the quality of the resultant images.

It is noted that the present invention provides an image reconstruction method applicable to a number of different imaging modalities including x-ray computed tomography ("CT"), x-ray C-arm imaging, magnetic resonance imaging ("MRI"), positron emission tomography ("PET"), and single photon emission computed tomography ("SPECT"). More specifically, the present invention provides an image reconstruction method that provides an increase in achievable signal-to-noise ratio ("SNR") in reconstructed images, without a significant decrease in spatial resolution. In this manner, trade-offs can be made with respect to other imaging considerations, such as radiation dose imparted to a subject and overall scan time, without a significant decrease in SNR as compared to currently available methods for image reconstruction.

As described above, the present invention is applicable to many different medical imaging modalities and may be utilized in many different clinical applications. A number of such exemplary clinical applications are described below to illustrate the broad scope of the present invention. Such embodiments do not necessarily represent the full scope of the invention, however, and reference is made therefore to the claims and herein for interpreting the scope of the invention.

X-Ray Computed Tomography Imaging System

Figure 4A:
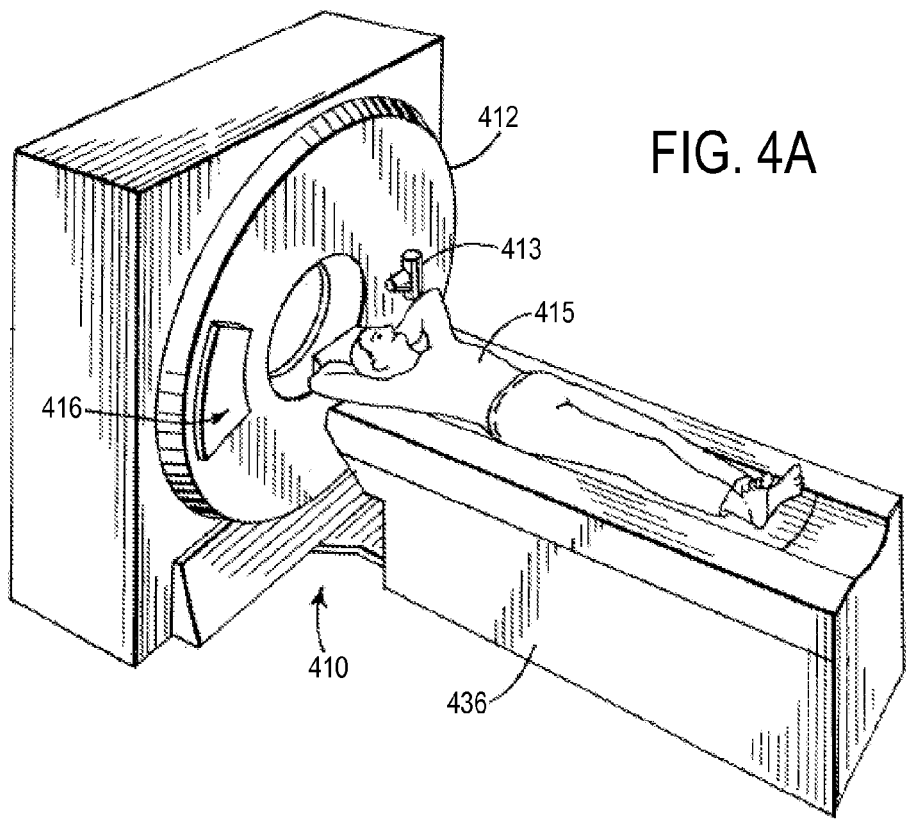
FIG. 4A is a pictorial view of an exemplary x-ray computed tomography ("CT") imaging system.
Figure 4B:
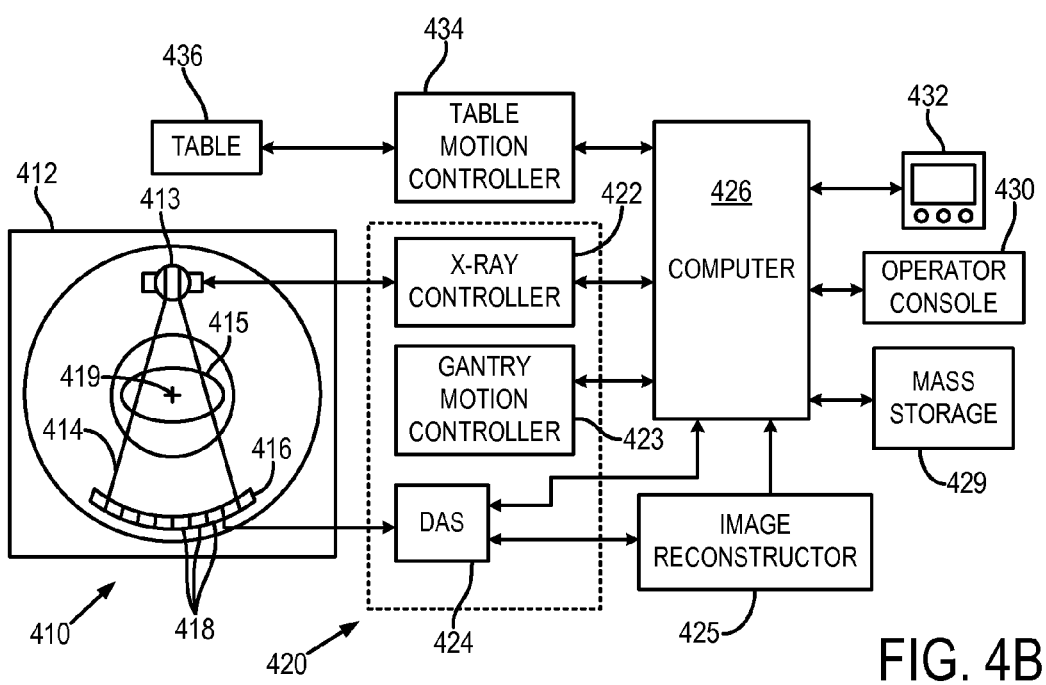
FIG. 4B is a block diagram of the CT imaging system of FIG. 4A.

With initial reference to FIGS. 4A and 4B, an x-ray computed tomography ("CT") imaging system 410 includes a gantry 412 representative of a "third generation" CT scanner. Gantry 412 has an x-ray source 413 that projects a fan-beam, or cone-beam, of x-rays 414 toward a detector array 416 on the opposite side of the gantry. The detector array 416 is formed by a number of detector elements 418 which together sense the projected x-rays that pass through a medical patient 415. Each detector element 418 produces an electrical signal that represents the intensity of an impinging x-ray beam and hence the attenuation of the beam as it passes through the patient. During a scan to acquire x-ray projection data, the gantry 412 and the components mounted thereon rotate about a center of rotation 419 located within the patient 415.

The rotation of the gantry and the operation of the x-ray source 413 are governed by a control mechanism 420 of the CT system. The control mechanism 420 includes an x-ray controller 422 that provides power and timing signals to the x-ray source 413 and a gantry motor controller 423 that controls the rotational speed and position of the gantry 412. A data acquisition system ("DAS") 424 in the control mechanism 420 samples analog data from detector elements 418 and converts the data to digital signals for subsequent processing. An image reconstructor 425, receives sampled and digitized x-ray data from the DAS 424 and performs high speed image reconstruction. The reconstructed image is applied as an input to a computer 426 which stores the image in a mass storage device 428.

The computer 426 also receives commands and scanning parameters from an operator via console 430 that has a keyboard. An associated display 432 allows the operator to observe the reconstructed image and other data from the computer 426. The operator supplied commands and parameters are used by the computer 426 to provide control signals and information to the DAS 424, the x-ray controller 422 and the gantry motor controller 423. In addition, computer 426 operates a table motor controller 434 which controls a motorized table 436 to position the patient 415 in the gantry 412.

C-Arm X-Ray Imaging System

Figure 5A:
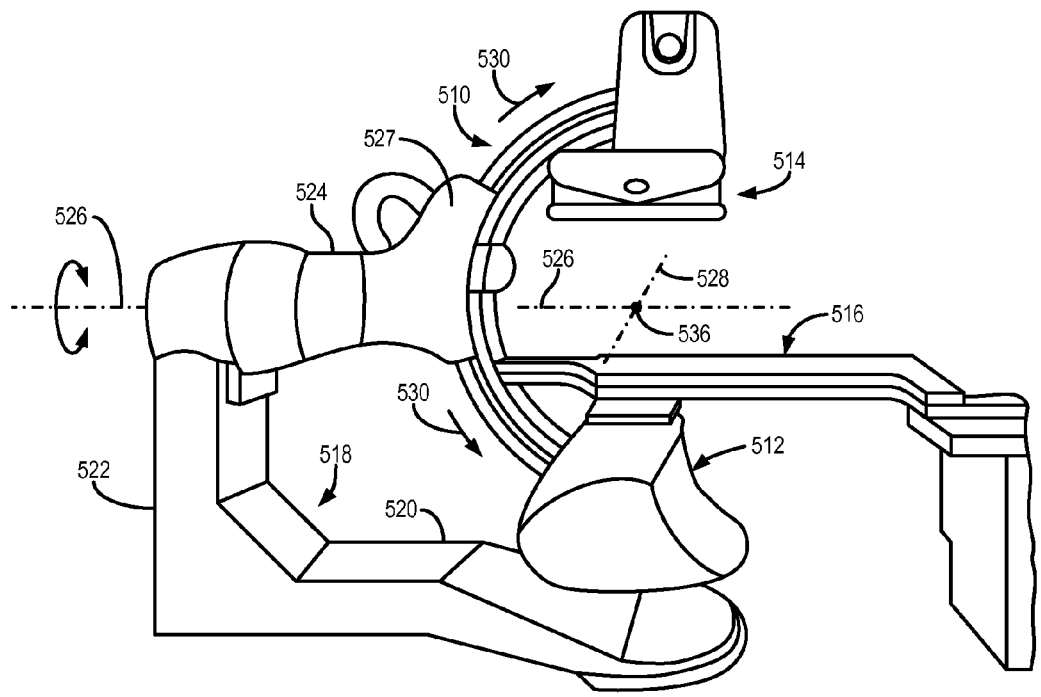
FIG. 5A is a pictorial view of an exemplary C-arm x-ray imaging system.
Figure 5B:
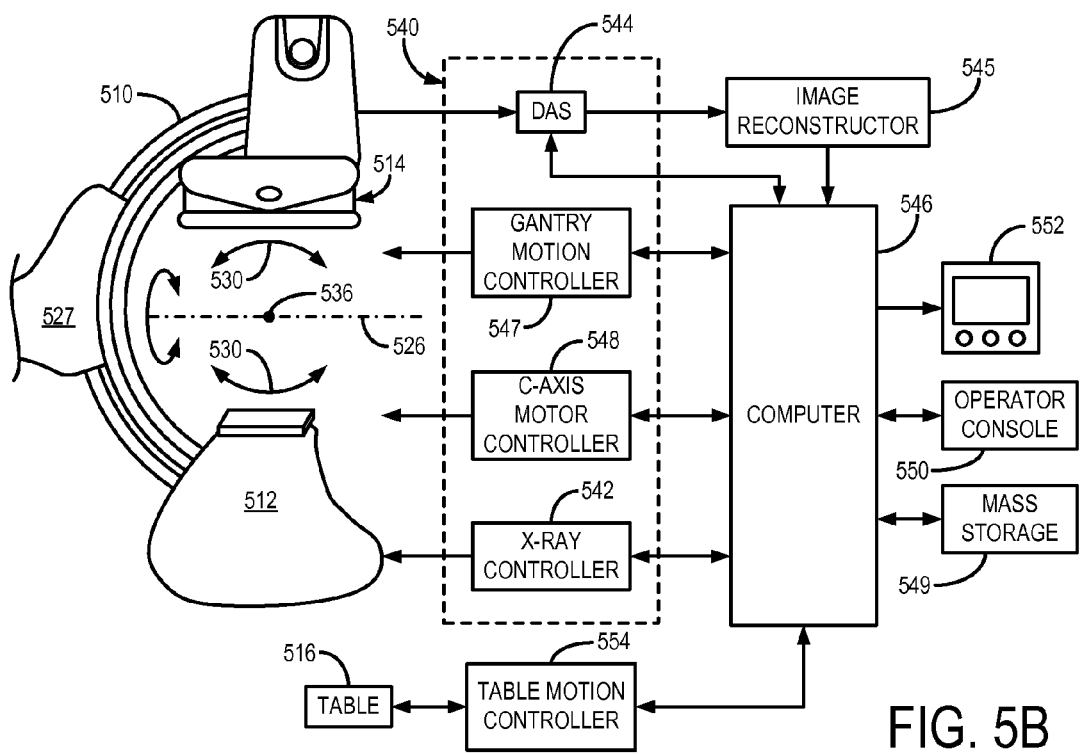
FIG. 5B is a block diagram of the C-arm x-ray imaging system of FIG. 5A.

Referring particularly to FIGS. 5A and 5B, an embodiment of the invention employs an x-ray system that is designed for use in connection with interventional procedures. It is characterized by a gantry having a C-arm 510 which carries an x-ray source assembly 512 on one of its ends and an x-ray detector array assembly 514 at its other end. The gantry enables the x-ray source 512 and detector 514 to be oriented in different positions and angles around a patient disposed on a table 516, while enabling a physician access to the patient.

The gantry includes an L-shaped pedestal 518 which has a horizontal leg 520 that extends beneath the table 516 and a vertical leg 522 that extends upward at the end of the horizontal leg 520 that is spaced from of the table 516. A support arm 524 is rotatably fastened to the upper end of vertical leg 522 for rotation about a horizontal pivot axis 526. The pivot axis 526 is aligned with the centerline of the table 516 and the arm 524 extends radially outward from the pivot axis 526 to support a C-arm drive assembly 527 on its outer end. The C-arm 510 is slidably fastened to the drive assembly 527 and is coupled to a drive motor (not shown) which slides the C-arm 510 to revolve it about a C-axis 528 as indicated by arrows 530. The pivot axis 526 and C-axis 528 intersect each other at an isocenter 536 located above the table 516 and they are perpendicular to each other.

The x-ray source assembly 512 is mounted to one end of the C-arm 510 and the detector array assembly 514 is mounted to its other end. As will be discussed in more detail below, the x-ray source 512 emits a cone beam of x-rays which are directed at the detector array 514. Both assemblies 512 and 514 extend radially inward to the pivot axis 526 such that the center ray of this cone beam passes through the system isocenter 536. The center ray of the cone beam can thus be rotated about the system isocenter around either the pivot axis 526 or the C-axis 528, or both during the acquisition of x-ray attenuation data from a subject placed on the table 516.

Figure 6A:
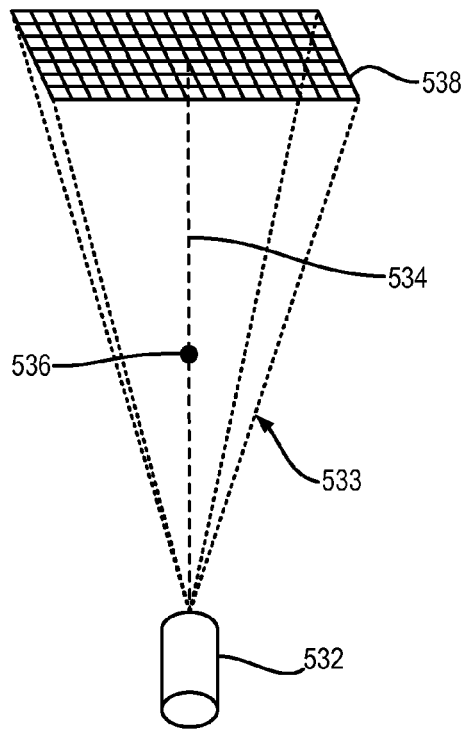
FIG. 6A is a pictorial view of the x-ray source and detector in the C-arm x-ray imaging system of FIG. 5A.

As shown in FIG. 6A, the x-ray source assembly 512 contains an x-ray source 532 which emits a cone beam 533 of x-rays when energized. The center ray 534 passes through the system isocenter 536 and impinges on a two-dimensional flat panel digital detector 538 housed in the detector assembly 514. The detector 538 is a 2048-by-2048 element two-dimensional array of detector elements having a size of 41 centimeters-by-41 centimeters. Each element produces an electrical signal that represents the intensity of an impinging x-ray and hence the attenuation of the x-ray as it passes through the patient. During a scan the x-ray source 532 and detector array 538 are rotated about the system isocenter 536 to acquire x-ray attenuation projection data from different angles. The detector array is able to acquire 30 projections, or views, per second and this is the limiting factor that determines how many views can be acquired for a prescribed scan path and speed.

Figure 6B:
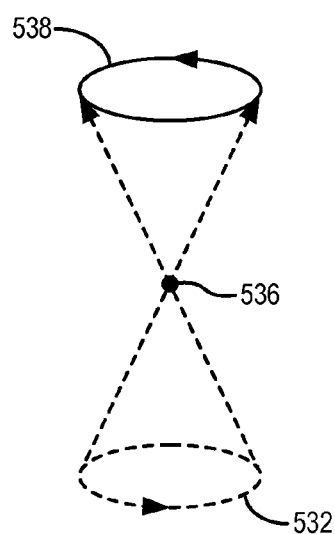
FIG. 6B is a pictorial view of the C-arm scan path employed by the C-arm x-ray imaging system of FIG. 5A.

Referring particularly to FIG. 6B, the rotation of the assemblies 512 and 514 and the operation of the x-ray source 532 are governed by a control mechanism 540 of the CT system. The control mechanism 540 includes an x-ray controller 542 that provides power and timing signals to the x-ray source 532. A data acquisition system ("DAS") 544 in the control mechanism 540 samples data from detector elements 538 and passes the data to an image reconstructor 545. The image reconstructor 545, receives digitized x-ray data from the DAS 544 and performs high speed image reconstruction according to the methods of the present invention. The reconstructed image is applied as an input to a computer 546 which stores the image in a mass storage device 549 or processes the image further.

The control mechanism 540 also includes pivot motor controller 547 and a C-axis motor controller 548. In response to motion commands from the computer 546 the motor controllers 547 and 548 provide power to motors in the x-ray system that produce the rotations about respective pivot axis 526 and C-axis 528. A program executed by the computer 546 generates motion commands to the motor drives 547 and 548 to move the assemblies 512 and 514 in a prescribed scan path.

X-Ray Computed Tomography and X-Ray C-Arm Image Reconstruction

Figure 7:
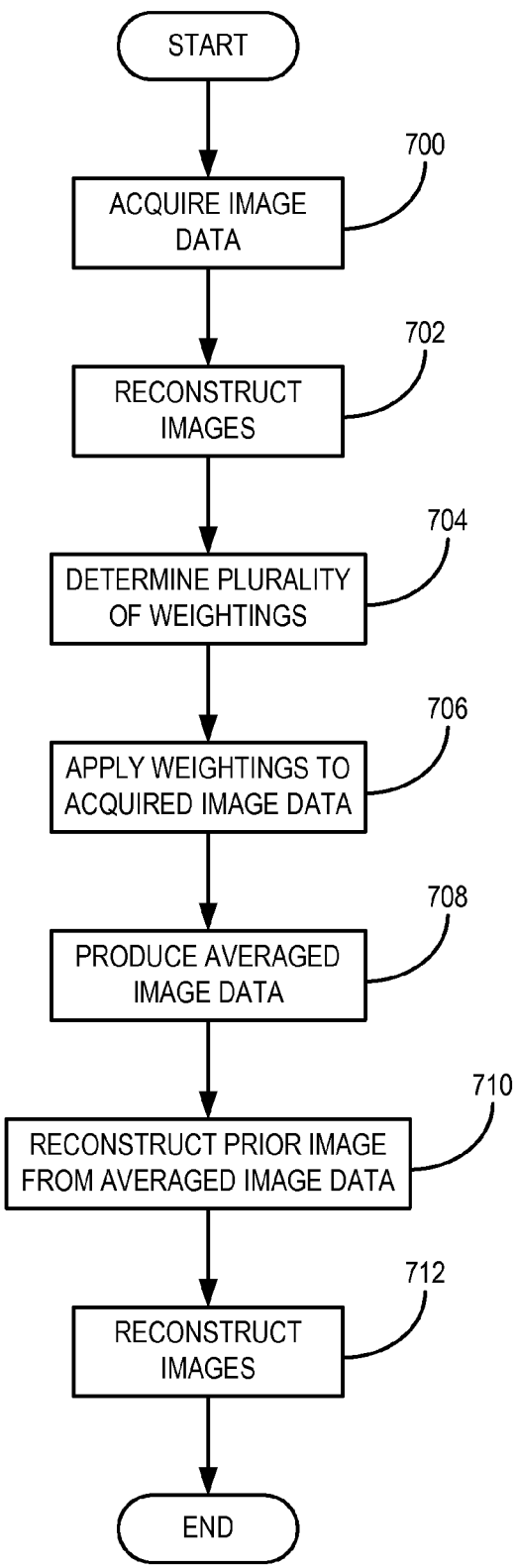
FIG. 7 is a flowchart setting forth the steps of an exemplary image reconstruction method in accordance with the present invention, which is employed when using the x-ray CT system of FIGS. 4A and 4B, or the x-ray C-arm imaging system of FIGS. 5A and 5B.

Referring now to FIG. 7, a flowchart setting forth the steps of an exemplary image reconstruction method in accordance with the present invention is illustrated. The image reconstruction method is applicable to x-ray imaging systems generally, and is described herein with respect to an x-ray CT system and x-ray C-arm system, in which image data is acquired by while moving the x-ray source and detector assemblies around the subject being imaged.

The method beings with the acquisition of image data, as indicated at step 700. This image data is acquired, for example, as a plurality of projection space data sets that are each acquired by operating the x-ray source and detector to rotate around the subject being imaged. For example, each projection space data set corresponds to an image slice location, such that, taken together, the plurality of projection space data sets correspond to a plurality of images of the subject associated with a respective plurality of image slice locations. Furthermore, the acquired image data is undersampled, such that the data acquisition time for each projection space data set, and indeed the image data as a whole, is significantly reduced. Moreover, since undersampling is employed, the number of x-ray projections measured is reduced. In turn, this yields a significant decrease in x-ray dose imparted to the subject. As will be described below in detail, the achievable decrease in x-ray dose, without a significant decrease in signal-to-noise ratio ("SNR") in the desired images, is proportional to the number of slice locations included when producing a prior image of the subject.

From the acquired image data, a plurality of image slices are reconstructed next, as indicated at step 702. This image reconstruction is a conventional image reconstruction, such as a filtered backprojection-type image reconstruction. Such reconstructed images will include a high level of noise. However, while the images are rendered ineffective for clinical use on account of the noise level, they are usable to produce a prior image of the subject having a high SNR that is, in turn, imparted to subsequently reconstructed images.

The production of a prior image in accordance with the present invention begins with the calculation of a plurality of weightings from the reconstructed images, as indicated at step 704. By way of example, for N image slices available for averaging, the simplest weighting scheme that can be used to average the image slices is to apply an equal weight of 1/N to all N slices. Alternatively, though, the weighting can be selected depending upon image pixel values at a given image slice. For example, for N image slices, the weightings for a given slice location, z, are calculated from information in the reconstructed image slices. The weightings are calculated, for example, by comparing each pixel location in an image slice with the corresponding pixel location in the nearest neighboring image slices. For example, the following comparison is made on a pixel-by-pixel basis:

$$|I_z(m,n) - I_{z\pm1}(m,n)| \geq T \qquad \text{Eqn. (19)}$$

where $I_z(m,n)$ is a pixel value for the $z^{th}$ image slice at the pixel location, $(m,n)$; $I_{z\pm1}(m,n)$ is the pixel value in the image slices adjacent the $z^{th}$ slice location at the same pixel location, $(m,n)$; and T is a threshold value, such as 1000 Hounsfield units ("HU"). When the comparison in Eqn. (19) is satisfied, then a weighting value of $w_z = 1/(N-1)$ is assigned to the $z^{th}$ slice location; otherwise, a weighting value of $w_z = 1/N$ is assigned to the slice location.

Using the aforementioned weighting scheme, an averaged image volume is generated with low noise level, but also with reduced spatial resolution along the z-direction. This image volume is used as the prior image in the PICCS reconstruction algorithm, together with the original projection data to reconstruct each individual image slice. As a result of the high SNR prior image, the final image will have a low noise level, but the z-resolution will be restored since the original projection data and its primitive spatial resolution is used to reconstruct the individual image slices.

An alternative implementation of the above image average process is to implement a weighting scheme for the projection data directly. For example, using the equal weighting scheme, after selecting the number, N, of image slices to average, a weighting function, 1/N, is directly applied to the projection data along the z-direction in detector plane.

After the weightings have been calculated, they are applied to the respective projection space data sets, as indicated at step 706. For example, the following calculations are performed:

$$\tilde{P}_1 = w_1 \cdot P(z_1)$$
$$\tilde{P}_2 = w_2 \cdot P(z_2)$$
$$\vdots$$
$$\tilde{P}_n = w_n \cdot P(z_n);$$

Eqn. (20)

where $\tilde{P}_n$ is the $n^{th}$ weighted projection data set produced by applying the $n^{th}$ weighting, $w_n$, to the $n^{th}$ projection space data set, $P(r_n)$, which corresponds to the image slice location, $z_n$. As noted above, the weighting for a given slice location, $w_z$, can be, for example, 1/(N-1) or 1/N. Additionally, it should be apparent that other weighting values can be implemented as well. The process of weighting the individual projection space data sets in this manner achieves the effect of reducing the contribution of those projection space data sets containing signal information significantly different than the other projection space data sets. The weighted projection space data sets, $\tilde{P}_n$, are then combined to form an averaged image data set, as indicated at step 708. For example, the averaged image data set, $\overline{P}$, is produced in accordance with the following:

$$\overline{P} = \sum_n \tilde{P}_n.$$

Eqn. (21)

The averaged image data set is so called because the effect of weighting the individual projection space data sets and summing them together, as described above, is similar to averaging the projection space data sets together. Viewed from another perspective, the process is one of filtering along a direction orthogonal to the image slices, such as along the z-axis when the image slices are transverse, or axial, images.

From the averaged image data set, a prior image of the subject, $I_p$, is reconstructed, as indicated at step 710. This image reconstruction is a conventional image reconstruction, such as a filtered backprojection-type reconstruction. Because the averaged image data set includes the contribution of signal information from a plurality of different projection space data sets, the prior image, $I_p$, contains high SNR. As indicated at step 712, this prior image, $I_p$, is then utilized to reconstruct the desired images of the subject. For example, a PICCS image reconstruction is performed in accordance with any of the methods illustrated in FIGS. 1-3 by, generally, selecting an estimate image, producing a sparsified image using the selected estimate image and the prior image, and reconstructing a desired image of the subject using the sparsified image, the selected estimate image, and the originally acquired image data. Further details regarding exemplary PICCS image reconstruction methods are disclosed, for example, in co-pending U.S. patent application Ser. No. 12/248,590, which is herein incorporated by reference in its entirety.

Figure 8:
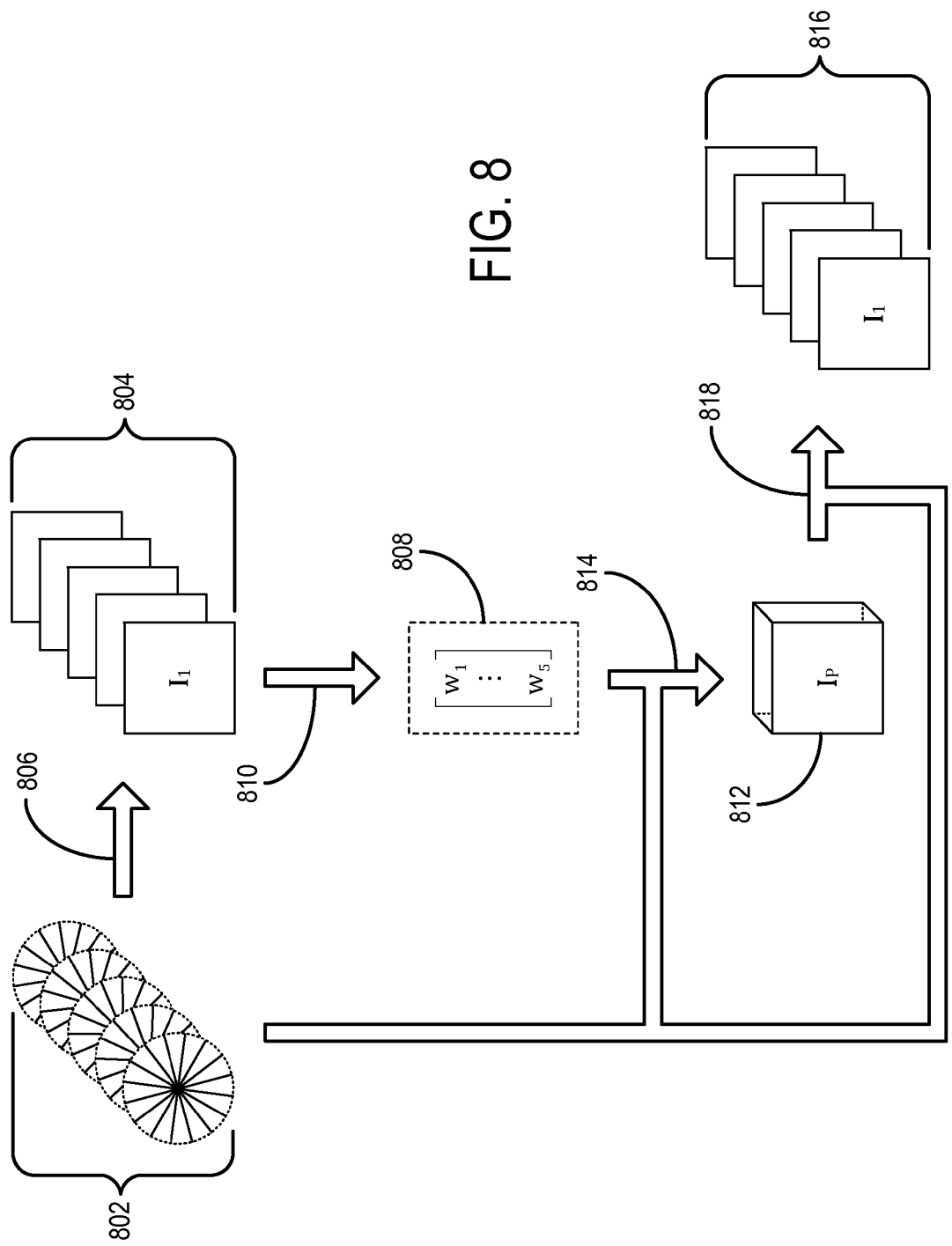
FIG. 8 is a graphic illustration of the weighted averaging and image reconstruction process of FIG. 7.

By way of example, and referring particularly now to FIG. 8, the aforementioned image reconstruction process is illustrated in an exemplary data flow diagram. The acquired projection data 802 corresponding to, for example, five slice locations is reconstructed to produce an associated series of five image slices, 804, the reconstruction shown generally as arrow 806. From the reconstructed image slices, 804, and in accordance with the method described above, a set of five weightings 808 are calculated, the calculation of the weightings shown generally as arrow 810. As described above, a different weighting value, $w_z$, is calculated for each image slice location, z. These weightings are then applied to the acquired projection data 802 in order to produce an averaged projection data set, from which a prior image 812 is reconstructed. The process of averaging the projection data and reconstructing the prior image is shown generally as arrow 814. Using the prior image, a PICCS algorithm is then implemented to reconstruct a series of target image slices 816, the target image slices 816 incorporating the high SNR of the prior image 812 while exhibiting appreciable spatial resolution not found in the prior image 812. The PICCS reconstruction is shown generally as arrow 818.

By implementing a prior image, such as the one described above, in a PICCS image reconstruction framework, the high SNR of the prior image is imparted to the desired images reconstructed in accordance with the PICCS image reconstruction. In this manner, images with higher SNR than achievable with PICCS alone are achievable, while still maintaining the spatial resolution benefits yielded by a PICCS image reconstruction. That is to say, the noise variance, $\sigma^2$, of the desired images are related to the SNR of the prior image, $I_p$, whereas the spatial resolution of the desired images are related to the selected estimate image, which is generally significantly higher than the prior image. This imparting of SNR from the prior image, while maintaining spatial resolution from the selected image estimate, breaks the traditional relationships between SNR and spatial resolution:

$$\sigma^2 \propto \frac{1}{\Delta x^3};$$

Eqn. (22)

for two-dimensional imaging, and $$\sigma^2 \propto \frac{1}{\Delta x^4};$$

Eqn. (23)

for three-dimensional imaging, where $\Delta x$ is spatial resolution.

Thus, the method of the present invention allows the reconstruction of images having higher SNR than achievable by the previous image reconstruction methods, such as the conventional filtered backprojection, without suffering from a decrease in spatial resolution. Because of this ability to effectively increase the SNR of reconstructed images, the tube current and mAs of an x-ray CT system, x-ray C-Arm system, or the like, can be decreased, such that an image of the subject can be obtained with a desirable SNR and spatial resolution, while significantly decreasing the x-ray dose imparted to the subject.

It is noted that, in general, the number, N, of projection space data sets that are used to produce the averaged image data set corresponds to the increase in SNR achievable with the method of the present invention. In turn, the number, N, of projection space data sets used to produce the averaged image data set is related to the degree to which tube current can be reduced without a significant decrease in SNR as compared to the SNR achievable with a conventional image reconstruction method and without decreasing the tube current. For example, it is contemplated that the relationship between SNR and tube current shown above in Eqn. (1) is altered as follows:

$$SNR = N \cdot \frac{\mu}{\sigma} \propto N \cdot \sqrt{Dose} \propto N \cdot \sqrt{mAs}.$$ Eqn. (24)

Magnetic Resonance Imaging System

Figure 9:
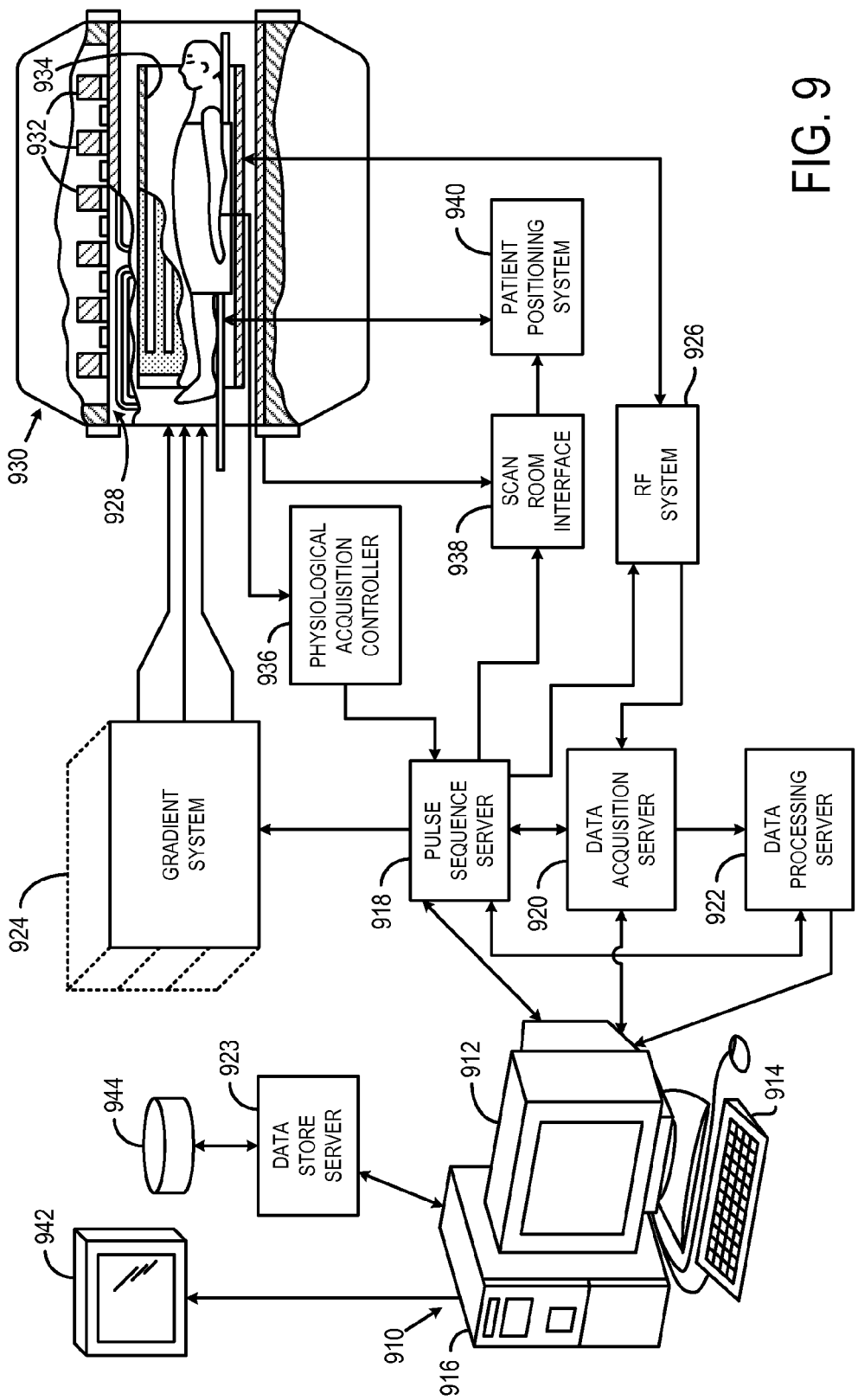
FIG. 9 is a block diagram of an exemplary magnetic resonance imaging ("MRI") system that employs the present invention.

Referring particularly to FIG. 9, the preferred embodiment of the invention is employed in a magnetic resonance imaging ("MRI") system. The MRI system includes a workstation 910 having a display 912 and a keyboard 914. The workstation 910 includes a processor 916 that is a commercially available programmable machine running a commercially available operating system. The workstation 910 provides the operator interface that enables scan prescriptions to be entered into the MRI system. The workstation 910 is coupled to four servers: a pulse sequence server 918; a data acquisition server 920; a data processing server 922, and a data store server 923. The workstation 910 and each server 918, 920, 922 and 923 are connected to communicate with each other.

The pulse sequence server 918 functions in response to instructions downloaded from the workstation 910 to operate a gradient system 924 and a radiofrequency ("RF") system 926. Gradient waveforms necessary to perform the prescribed scan are produced and applied to the gradient system 924 that excites gradient coils in an assembly 928 to produce the magnetic field gradients $G_x$, $G_y$, and $G_z$ used for position encoding MR signals. The gradient coil assembly 928 forms part of a magnet assembly 930 that includes a polarizing magnet 932 and a whole-body RF coil 934.

RF excitation waveforms are applied to the RF coil 934 by the RF system 926 to perform the prescribed magnetic resonance pulse sequence. Responsive MR signals detected by the RF coil 934 or a separate local coil (not shown in FIG. 9) are received by the RF system 926, amplified, demodulated, filtered and digitized under direction of commands produced by the pulse sequence server 918. The RF system 926 includes an RF transmitter for producing a wide variety of RF pulses used in MR pulse sequences. The RF transmitter is responsive to the scan prescription and direction from the pulse sequence server 918 to produce RF pulses of the desired frequency, phase and pulse amplitude waveform. The generated RF pulses may be applied to the whole body RF coil 934 or to one or more local coils or coil arrays (not shown in FIG. 9).

The RF system 926 also includes one or more RF receiver channels. Each RF receiver channel includes an RF amplifier that amplifies the MR signal received by the coil to which it is connected and a detector that detects and digitizes the I and Q quadrature components of the received MR signal. The magnitude of the received MR signal may thus be determined at any sampled point by the square root of the sum of the squares of the I and Q components:

$$M = \sqrt{I^2 + Q^2}$$ Eqn. (25);

and the phase of the received MR signal may also be determined:

$$\phi = \tan^{-1}\left(\frac{Q}{I}\right).$$ Eqn. (26)

The pulse sequence server 918 also optionally receives patient data from a physiological acquisition controller 936. The controller 936 receives signals from a number of different sensors connected to the patient, such as ECG signals from electrodes or respiratory signals from a bellows. Such signals are typically used by the pulse sequence server 918 to synchronize, or "gate," the performance of the scan with the subject's respiration or heart beat.

The pulse sequence server 918 also connects to a scan room interface circuit 938 that receives signals from various sensors associated with the condition of the patient and the magnet system. It is also through the scan room interface circuit 938 that a patient positioning system 940 receives commands to move the patient to desired positions during the scan.

The digitized MR signal samples produced by the RF system 926 are received by the data acquisition server 920. The data acquisition server 920 operates in response to instructions downloaded from the workstation 910 to receive the real-time MR data and provide buffer storage such that no data is lost by data overrun. In some scans the data acquisition server 920 does little more than pass the acquired MR data to the data processor server 922. However, in scans that require information derived from acquired MR data to control the further performance of the scan, the data acquisition server 920 is programmed to produce such information and convey it to the pulse sequence server 918. For example, during prescans MR data is acquired and used to calibrate the pulse sequence performed by the pulse sequence server 918. Also, navigator signals may be acquired during a scan and used to adjust RF or gradient system operating parameters or to control the view order in which k-space is sampled. And, the data acquisition server 920 may be employed to process MR signals used to detect the arrival of contrast agent in a magnetic resonance angiography (MRA) scan. In all these examples the data acquisition server 920 acquires MR data and processes it in real-time to produce information that is used to control the scan.

The data processing server 922 receives MR data from the data acquisition server 920 and processes it in accordance with instructions downloaded from the workstation 910. Such processing may include, for example: Fourier transformation of raw k-space MR data to produce two or three-dimensional images; the application of filters to a reconstructed image; the performance of a backprojection image reconstruction of acquired MR data; the calculation of functional MR images; and the calculation of motion or flow images.

Images reconstructed by the data processing server 922 are conveyed back to the workstation 910 where they are stored. Real-time images are stored in a data base memory cache (not shown) from which they may be output to operator display 912 or a display 942 that is located near the magnet assembly 930 for use by attending physicians. Batch mode images or selected real time images are stored in a host database on disc storage 944. When such images have been reconstructed and transferred to storage, the data processing server 922 notifies the data store server 923 on the workstation 910. The workstation 910 may be used by an operator to archive the images, produce films, or send the images via a network to other facilities.

Exemplary Magnetic Resonance Imaging Pulse Sequence

Figure 10:
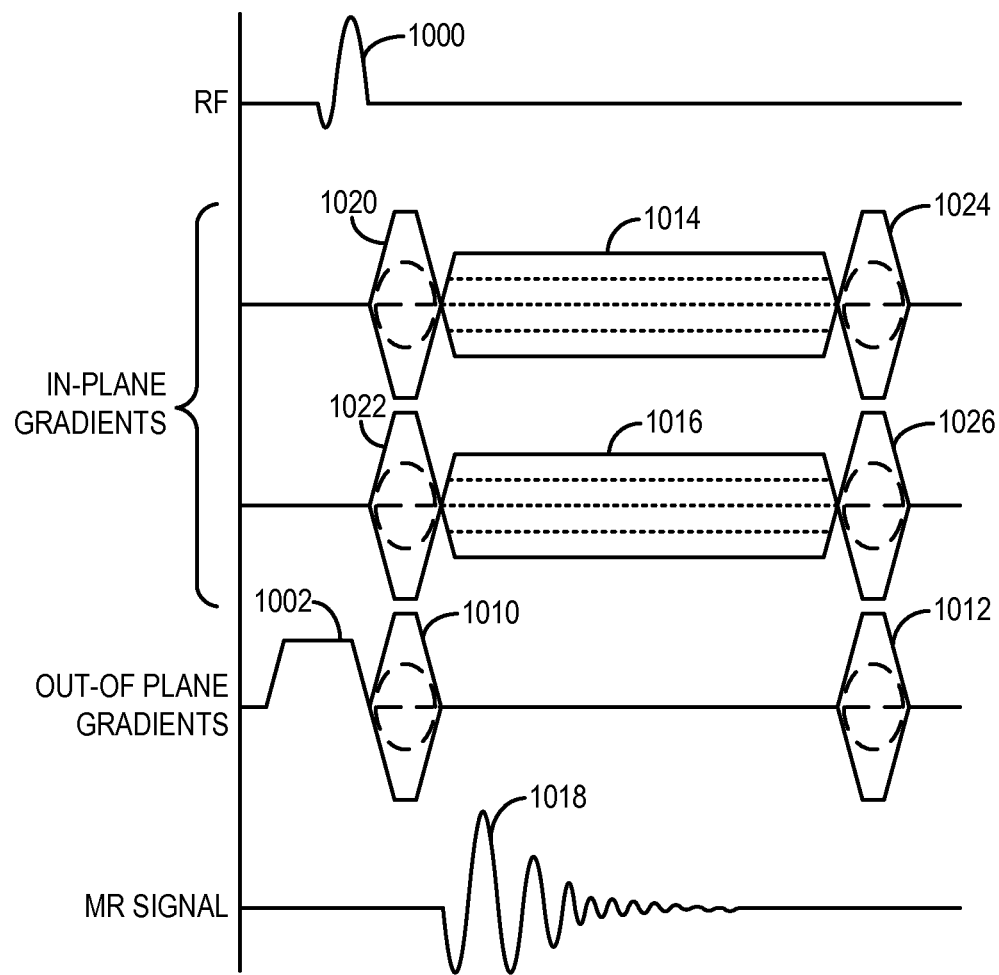
FIG. 10 is a graphic illustration of an exemplary gradient-recalled echo pulse sequence for directing the MRI system of FIG. 9 to acquire image data by sampling along a series of radial k-space trajectories in accordance with the present invention.

An exemplary pulse sequence employed to direct the MRI system to acquire image data in accordance with the present invention is illustrated in FIG. 10. Such an exemplary pulse sequence is generally referred to as a gradient-recalled echo ("GRE") that samples k-space along a series of radial projections, such as projections that extend from the center of k-space out to a peripheral portion in k-space defined by a k-space radius, R. The pulse sequence includes a radio frequency ("RF") excitation pulse 1000 that is produced in the presence of a slice-selective gradient 1002. This pulse sequence may be used to acquire a single two-dimensional slice by sampling in a single plane in k-space, or it may be used to sample a plurality of planes in k-space.

Figure 11:
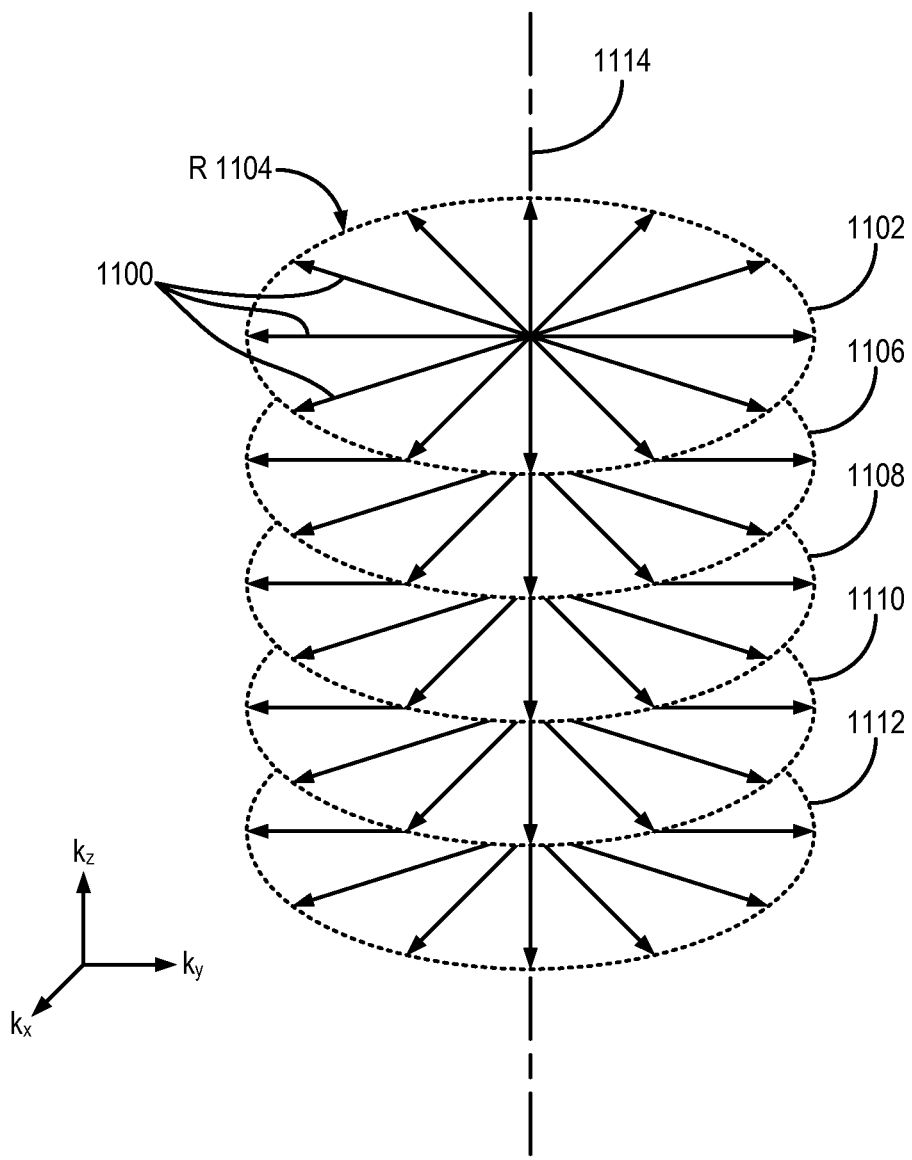
FIG. 11 is a pictorial representation of the k-space sampling pattern produced using the pulse sequence of FIG. 10.

For example, and referring now to FIG. 11, k-space can be sampled along a plurality of radial projections, or radial trajectories, 1100 that lie in a first k-space plane 1102. As noted above, the radial projections extend outward from the center of k-space to a peripheral portion of k-space defined by a k-space radius, R, as shown by dashed line 1104.

Referring again to FIG. 10, when multiple two-dimensional slices are acquired, the slice-selective gradient 1002 is a slab-selective gradient followed by a phase encoding gradient lobe 1010 and a rewinder gradient lobe 1012, which is opposite in polarity with respect to the phase encoding lobe 1010. Both the phase encoding gradient lobe 1010 and the rewinder gradient lobe 1012 are played out along the same gradient axis as the slab selective gradient 1002. The phase encoding gradient 1010 is stepped through a plurality of different values during subsequent repetitions of the pulse sequence in order to sample k-space in each of a plurality of respective k-space planes.

In this manner, different planes in k-space, such as planes 1106, 1108, 1110, and 1112 in FIG. 11, are sampled. Such planes are substantially parallel and are disposed along a common longitudinal axis 1114. The direction of the longitudinal axis 1114 is defined by the slab-selective gradient 1002. For example, if the slab-selective gradient 1002 is played out along the $G_z$ gradient axis, then the longitudinal axis 1114 will lie along the z-axis and each sampled k-space plane will correspond to an image slice along the z-axis. That is, images will be acquired as transverse slices through the subject. It will be readily appreciated by those skilled in the art that the slab-selective gradient 1002 can similarly be played out along the $G_x$ gradient axis, the $G_y$ gradient axis, or combinations of the three principle gradient axes such that images are acquired as sagittal, coronal, or oblique slices, respectively.

Two in-plane readout gradients 1014 and 1016 are played out during the acquisition of a nuclear magnetic resonance ("NMR") echo signal 1018 to sample k-space in a given plane (1102, 1106, 1108, 1110, 1112) along a radial trajectory 1100. These in-plane gradients 1014 and 1016 are perpendicular to the slab-selective gradient 1002, and they are also perpendicular to each other. During subsequent repetitions of the pulse sequence, the in-plane readout gradients 1014 and 1016 are stepped through a series of values in order to rotate the view angle of the radial sampling trajectory 1100, as will be described in more detail below. In such a manner, all of the series of values for the in-plane readout gradients 1014 and 1016 are employed before the phase encoding gradient lobe 1010 is stepped to a subsequent value, such that a plane in k-space is sampled along a plurality of radial trajectories 1100 before moving to a different plane in k-space. Each of the in-plane readout gradients is preceded by a prephasing gradient lobe, 1020 and 1022, and followed by a rewinder gradient lobe, 1024 and 1026.

It should be apparent to those skilled in the art that sampling trajectories other than the one described above can be employed. For example, a straight line trajectory extending from one point on the k-space peripheral boundary, through the center of k-space, and to an opposite point on the k-space peripheral boundary may also be used. Another variation which is similar to the straight line projection reconstruction pulse sequence is to sample along a curved path, or spiral, rather than a straight line. Such pulse sequences are described, for example, by F. E. Boada, et al., in "Fast Three Dimensional Sodium Imaging," Magnetic Resonance in Medicine, 1997; (37):706-715; by K. V. Koladia in "Rapid 3D PC-MRA Using Spiral Projection Imaging," Proc. Intl. Soc. Magn. Reson. Med. 13, 2005; and by J. G. Pipe and K. V. Koladia in "Spiral Projection Imaging: A New Fast 3D Trajectory," Proc. Intl. Soc. Mag. Reson. Med. 13, 2005. It should further be appreciated by those skilled in the art that Cartesian sampling patterns can also be employed to practice the present invention.

Magnetic Resonance Image Reconstruction

The MRI system described above can be used in a wide variety of clinical applications to acquire image data that may be used to reconstruct one or more images. The image reconstruction method of the present invention is particularly useful when employing so-called "parallel imaging" methods, in which signal-to-noise ratio ("SNR") of the resultant images are reduced according to:

$$SNR \propto \frac{1}{g\sqrt{R}}; \qquad \text{Eqn. (27)}$$

where g is the so-called geometry factor, or "g-factor," and R is the so-called "acceleration factor." Generally speaking, the g-factor is a coil-dependent noise amplification factor. In general, when a parallel array of RF receiver coils is implemented to acquire image data, an acceleration, R, equal to the number of coils in the array can be achieved. This acceleration furthermore corresponds to the reduction in the amount of k-space sampled in the acquired image data. For example, an acceleration of R=4 can be achieved with a coil array having at least four receiver coils, and image data acquired with such an acceleration is acquired by undersampling k-space by sampling 25 percent of the samples required by the Nyquist criterion. As will be described below, an increase in SNR that can offset the SNR losses with parallel imaging techniques is achievable with the method of the present invention.

Figure 12:
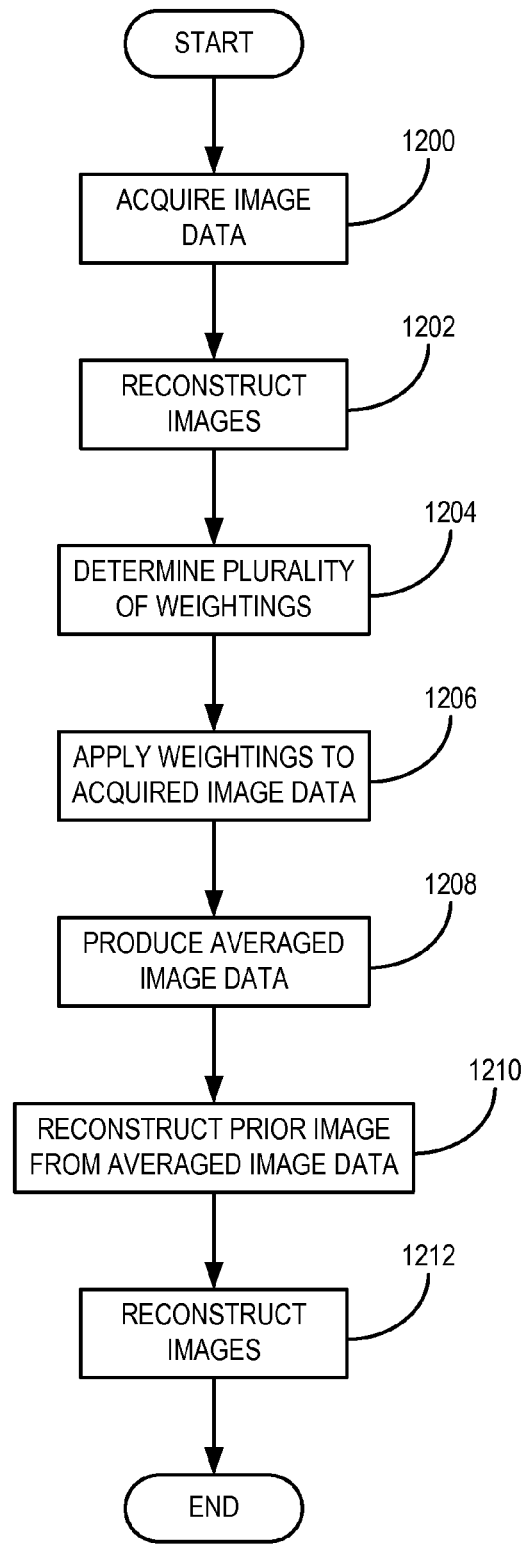
FIG. 12 is a flowchart setting forth the steps of an exemplary method for producing a prior image and reconstructing an image in accordance with the present invention when employing an MRI system such as the one in FIG. 9.

Referring now to FIG. 12, a flowchart setting forth the steps of an exemplary magnetic resonance image reconstruction method in accordance with the present invention is illustrated. The method begins with the acquisition of image data, as indicated at step 1200. This image data is acquired, for example, as a plurality of k-space data sets that are each acquired by directing the MRI system to perform a pulse sequence, such as the one illustrated in FIG. 10, in order to sample k-space. It will be appreciated by those skilled in the art that k-space can be sampled in any number of different manners, such as by sampling along radial trajectories, spiral trajectories, or Cartesian trajectories. By way of example, each k-space data set corresponds to an image slice location, such that, taken together, the plurality of k-space data sets correspond to a plurality of images of the subject associated with a respective plurality of image slice locations. Furthermore, the acquired image data is undersampled, such that the data acquisition time for each k-space data set, and indeed the image data as a whole, is significantly reduced.

It is noted that the image data is acquired using an array of radio frequency ("RF") receiver coils. As a result, the SNR achievable by reconstructing an image using conventional reconstruction methods is significantly reduced, in accordance with Eqn. (27). However, by implementing the herein described method, the SNR of the desired images is significantly increased, without affecting the achievable spatial resolution.

From the acquired image data, a plurality of images are reconstructed next, as indicated at step 1202. This image reconstruction is a conventional image reconstruction, and depends on the manner in which k-space was sampled. For example, when k-space is sampled along a series of radial trajectories image reconstruction can be performed using filtered backprojection-type methods, or by regridding the radial samples to a Cartesian grid and performing a Fourier transform. Such reconstructed images include artifacts, such as aliasing, as a result of the undersampling employed when acquiring the image data. Thus, while the images are rendered ineffective for clinical use on account of the artifacts, they are usable to produce a prior image of the subject having a high SNR that is, in turn, imparted to subsequently reconstructed images.

The production of a prior image in accordance with the present invention begins with the calculation of a plurality of weightings from the reconstructed images, as indicated at step 1204. The weightings are determined for a given slice location, meaning that they are calculated from information in a given reconstructed image, but they are subsequently applied to the associated k-space data set.

As described above, an equal weighting of 1/N can be applied to each of N reconstructed images slices; however, the weightings can also be calculated based on a comparison of pixels in a current image slice with those adjacent thereto. For example, the weightings for a given slice location, z, are calculated from information in the N reconstructed image slices by comparing each pixel location in an image slice with the corresponding pixel location in the nearest neighboring image slices. For example, the following comparison is made on a pixel-by-pixel basis:

$$|I_z(m,n) - I_{z\pm1}(m,n)| \geq T \qquad \text{Eqn. (28)}$$

where $I_z(m,n)$ is a pixel value for the $z^{th}$ image slice at the pixel location, $(m,n)$; $I_{z\pm1}(m,n)$ is the pixel value in the image slices adjacent the $z^{th}$ slice location at the same pixel location, $(m,n)$; and T is a threshold value. When the comparison in Eqn. (28) is satisfied, then a weighting value of $w_z=1/(N-1)$ is assigned to the $z^{th}$ slice location; otherwise, a weighting value of $w_z=1/N$ is assigned to the slice location.

After the weightings have been calculated, they are applied to the respective k-space data sets, as indicated at step 1206. For example, the following calculations are performed:

$$\tilde{S}_1 = w_1 \cdot S(z_1) \qquad \text{Eqn. (29)}$$
$$\tilde{S}_2 = w_2 \cdot S(z_2)$$
$$\vdots$$
$$\tilde{S}_n = w_n \cdot S(z_n);$$

where $\tilde{S}_n$ is the $n^{th}$ weighted k-space data set produced by applying the $n^{th}$ weighting, $w_n$, to the $n^{th}$ k-space data set, $S(k_n)$, which corresponds to the image slice location, $z_n$. The process of weighting the individual k-space data sets in this manner achieves the effect of reducing the contribution of those k-space data sets containing signal information significantly different than the other k-space data sets. The weighted k-space data sets, $\tilde{S}_n$, are then combined to form an averaged image data set, as indicated at step 1208. For example, the averaged image data set, $\tilde{S}$, is produced in accordance with the following:

$$\tilde{S} = \sum_n \tilde{S}_n. \qquad \text{Eqn. (30)}$$

The averaged image data set is so called because the effect of weighting the individual k-space data sets and summing them together, as described above, is similar to averaging the k-space data sets together. Viewed from another perspective, the process is one of filtering along a direction orthogonal to the image slices, such as along the z-axis when the image slices are transverse, or axial, images.

From the averaged image data set, a prior image of the subject, $I_p$, is reconstructed, as indicated at step 1210. This image reconstruction is a conventional image reconstruction, and depends on the manner in which k-space was sampled. For example, when k-space is sampled along a series of radial trajectories image reconstruction can be performed using filtered backprojection-type methods, or by regridding the radial samples to a Cartesian grid and performing a Fourier transform. Because the averaged image data set includes the contribution of signal information from a plurality of different k-space data sets, the prior image, $I_p$, contains high SNR. As indicated at step 1212, this prior image, $I_p$, is then utilized to reconstruct the desired images of the subject. For example, a PICCS image reconstruction is performed in accordance with any of the methods illustrated in FIGS. 1-3 by, generally, selecting an estimate image, producing a sparsified image using the selected estimate image and the prior image, and reconstructing a desired image of the subject using the sparsified image, the selected estimate image, and the originally acquired image data. Further details regarding exemplary PICCS image reconstruction methods are disclosed, for example, in co-pending U.S. patent application Ser. No. 12/248,590, which is herein incorporated by reference in its entirety.

By implementing a prior image, such as the one described above, in a PICCS image reconstruction framework, the high SNR of the prior image is imparted to the desired images reconstructed in accordance with the PICCS image reconstruction. In this manner, images with higher SNR than achievable with PICCS alone are achievable, while still maintaining the spatial resolution benefits yielded by a PICCS image reconstruction. That is to say, the noise variance, $\sigma^2$, of the desired images are related to the SNR of the prior image, $I_p$, whereas the spatial resolution of the desired images are related to the selected estimate image, which is generally significantly higher than the prior image. This imparting of SNR from the prior image, while maintaining spatial resolution from the selected image estimate, breaks the traditional relationships between SNR and spatial resolution:

$$\sigma^2 \propto \frac{1}{\Delta x^3}; \qquad \text{Eqn. (31)}$$

for two-dimensional imaging, and $$\sigma^2 \propto \frac{1}{\Delta x^4}; \quad \text{Eqn. (32)}$$

for three-dimensional imaging, where $\Delta x$ is spatial resolution.

Thus, the method of the present invention allows the reconstruction of images from undersampled image data, the images having higher SNR than achievable previous image reconstruction methods without sacrificing a decrease in spatial resolution. Because of this ability to effectively increase the SNR of reconstructed images, parallel MRI methods can be implemented without the conventional loss in SNR. In this manner, scan time can be significantly reduced while maintaining a desirable image quality. It is noted that, in general, the number, N, of k-space data sets that are used to produce the averaged image data set corresponds to the increase in SNR achievable with the method of the present invention. For example, it is contemplated that the SNR relationship shown above in Eqn. (27) is altered as follows:

$$SNR \propto \frac{N}{g\sqrt{R}}. \quad \text{Eqn. (33)}$$

The present invention has been described in terms of one or more preferred embodiments, and it should be appreciated that many equivalents, alternatives, variations, and modifications, aside from those expressly stated, are possible and within the scope of the invention.

The invention claimed is:

1. A method for reconstructing an image of a subject with an x-ray computed tomography (CT) system, the steps of the method comprising:
   a) acquiring, with the CT system, image data from the subject;
   b) reconstructing a plurality of images from the acquired image data, the plurality of images corresponding to a respective plurality of image slices;
   c) calculating a plurality of weightings from the reconstructed plurality of images;
   d) producing weighted image data by applying the calculated plurality of weightings to the acquired image data such that the acquired image data is filtered along a direction orthogonal to an orientation of the plurality of image slices;
   e) reconstructing a prior image from the weighted image data;
   f) selecting an estimate image of the subject
   g) producing a sparsified image of the subject using the prior image and the estimate image; and
   h) reconstructing a desired image of the subject using the sparsified image, the estimate image, and the acquired image data.

2. The method as recited in claim 1 in which the acquired image data includes a plurality of projection space data sets, each projection space data set corresponding to one of the respective plurality of image slices.

3. The method as recited in claim 2 in which each of the plurality of weightings calculated in step c) corresponds to a respective one of the plurality of projection space data sets, and a selected number of weightings are calculated.

4. The method as recited in claim 3 in which step d) includes applying each of the plurality of calculated weighting to the corresponding respective one of the plurality of projection space data sets in order to produce a respective plurality of weighted projection space data sets.

5. The method as recited in claim 4 in which step e) includes producing an average image data set by summing the plurality of weighted projection space data sets.

6. The method as recited in claim 4 in which the selected number of calculated weightings corresponds to a number of projection space data sets filtered in step d).

7. The method as recited in claim 3 in which the selected number of calculated weightings is proportional to a decrease in x-ray dose imparted to the subject during step a), the decrease in x-ray dose being achievable without significantly degrading signal-to-noise ratio in the desired image.

8. The method as recited in claim 1 in which step c) includes comparing a difference between one of the reconstructed plurality of images and another one of the reconstructed plurality of images that is adjacent the one of the reconstructed plurality of images with a threshold value.

9. The method as recited in claim 8 in which the reconstructed plurality of images includes a number of images, and one of the plurality of weightings corresponding to the one of the reconstructed plurality of images is assigned a value of one less than the number of images when the difference is greater than or equal to the threshold value.

10. The method as recited in claim 8 in which the threshold value is 1000 Hounsfield units.

11. A method for reconstructing an image of a subject with a medical imaging system, the steps of the method comprising:
   a) acquiring, with the medical imaging system, a plurality of image data sets from the subject, each of the plurality of image data sets corresponding to a respective one of a plurality of image slice locations;
   b) producing an average image data set by averaging the plurality of image data sets along a direction that is orthogonal to an orientation of the plurality of image slice locations;
   c) reconstructing a prior image of the subject from the average image data set;
   d) selecting an estimate image of the subject
   e) producing a sparsified image of the subject using the prior image and the estimate image; and
   f) reconstructing a desired image of the subject using the sparsified image, the estimate image, and the acquired plurality of image data sets.

12. The method as recited in claim 11 in which the medical imaging system is at least one of an x-ray computed tomography system, an x-ray C-arm imaging system, a positron emission tomography system, a single photon excitation computed tomography system, and a magnetic resonance imaging system.

13. The method as recited in claim 11 in which step b) includes:
   i) reconstructing a plurality of images from the acquired plurality of image data sets, each of reconstructed plurality of images corresponding to a respective one of the plurality of image slice locations;
   ii) calculating a plurality of weightings from the reconstructed plurality of images;
   iii) producing a plurality of weighted image data sets by applying the calculated plurality of weightings to the acquired plurality of image data sets such that the acquired plurality of image data sets is filtered along the direction orthogonal to the orientation of the plurality of image slice locations; and iv) producing the average image data set by summing the produced plurality of weighted image data sets.

\* \* \* \* \*

UNITED STATES PATENT AND TRADEMARK OFFICE
CERTIFICATE OF CORRECTION

PATENT NO. : 8,483,463 B2  Page 1 of 1
APPLICATION NO. : 12/783058
DATED : July 9, 2013
INVENTOR(S) : Guang-Hong Chen et al.

It is certified that error appears in the above-identified patent and that said Letters Patent is hereby corrected as shown below:

In the Specifications:

Column 1, lines 8 through 11, "This invention was made with United States Government support awarded by the following agency: National Institutes of Health, NIH EB005712. The United States Government has certain rights in this invention." should be --This invention was made with government support under EB005712 awarded by the National Institutes of Health. The government has certain rights in the invention.--

Signed and Sealed this
Third Day of September, 2013

Teresa Stanek Rea
*Acting Director of the United States Patent and Trademark Office*